United States Patent
Williams et al.

(10) Patent No.: US 12,297,150 B2
(45) Date of Patent: May 13, 2025

(54) MAINTENANCE TREATMENTS USEFUL FOR IMPROVING THE PERFORMANCE OF AGED OR BRITTLE RESINOUS BINDERS IN PAVING OR ROOFING

(71) Applicant: IOWA STATE UNIVERSITY RESEARCH FOUNDATION, INC., Ames, IA (US)

(72) Inventors: Ronald Christopher Williams, Ames, IA (US); Eric W. Cochran, Ames, IA (US); Theodore Huisman, Ames, IA (US); Ashley F. Buss, Ames, IA (US); Irvin Pinto, Ames, IA (US); Nacu Hernandez, Ames, IA (US); Joseph Podolsky, Ames, IA (US); Michael J. Forrester, Ames, IA (US); Maxwell D. Staver, Ames, IA (US); Baker W. Kuehl, Ames, IA (US); Austin D. Hohmann, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 618 days.

(21) Appl. No.: 17/499,081

(22) Filed: Oct. 12, 2021

(65) Prior Publication Data
US 2022/0112130 A1   Apr. 14, 2022

Related U.S. Application Data

(60) Provisional application No. 63/090,503, filed on Oct. 12, 2020.

(51) Int. Cl.
*C08L 95/00* (2006.01)
*C04B 26/26* (2006.01)
(Continued)

(52) U.S. Cl.
CPC ............ *C04B 26/26* (2013.01); *C08L 95/005* (2013.01); *C09D 195/00* (2013.01); *C04B 2111/0075* (2013.01)

(58) Field of Classification Search
CPC ...................................... C08L 95/005
See application file for complete search history.

(56) References Cited

U.S. PATENT DOCUMENTS 2,782,216 A   2/1957   Hayes et al.
3,010,925 A   11/1961  Lynn
(Continued)

FOREIGN PATENT DOCUMENTS

CA   2 902 935 A1   4/2017
CN   101041574 A   9/2007
(Continued)

OTHER PUBLICATIONS

Office Action for U.S. Appl. No. 17/140,465, filed Jun. 9, 2023.
(Continued)

*Primary Examiner* — Alexandra M Moore
(74) *Attorney, Agent, or Firm* — Troutman Pepper Locke LLP (Rochester)

(57) ABSTRACT

Provided herein are an emulsified asphalt product and an emulsified coating product. Both emulsified products contain one or more rejuvenators of formula (I) or formula (X). The emulsified asphalt product is useful for improving the performance of aged or brittle resinous binders in paving applications while the emulsified coating product is similarly useful in roofing applications. Also provided herein is a treated bituminous pavement where the performance grade varies with depth.

15 Claims, 18 Drawing Sheets

(51) Int. Cl.
  *C09D 195/00* (2006.01)
  *C04B 111/00* (2006.01)

(56) References Cited

U.S. PATENT DOCUMENTS

| | | | |
|---|---|---|---|
| 3,070,608 A | 12/1962 | Kuester et al. |
| 3,125,592 A | 3/1964 | Nevin |
| 3,755,226 A | 8/1973 | Christiansen et al. |
| 4,597,799 A | 7/1986 | Schilling |
| 4,806,166 A | 2/1989 | Schilling et al. |
| 4,836,857 A | 6/1989 | Hopkins |
| 4,966,490 A | 10/1990 | Hodson |
| 5,023,282 A | 6/1991 | Neubert |
| 5,221,703 A | 6/1993 | Ostermeyer |
| 5,271,767 A | 12/1993 | Light, Sr. et al. |
| 5,437,717 A | 8/1995 | Doyle et al. |
| 5,473,000 A | 12/1995 | Pinomaa |
| 6,495,074 B1 | 12/2002 | Carr |
| 6,749,677 B2 | 6/2004 | Freisthler |
| 6,764,542 B1 | 7/2004 | Lackey et al. |
| 6,797,753 B2 | 9/2004 | Benecke et al. |
| 7,074,266 B2 | 7/2006 | Hawkins et al. |
| 7,420,008 B2 | 9/2008 | Bloom |
| 7,662,225 B2 | 2/2010 | Antoine et al. |
| 7,842,746 B2 | 11/2010 | Bloom et al. |
| 7,951,238 B2 | 5/2011 | Deneuvillers et al. |
| 7,951,766 B1 | 5/2011 | Frenkel et al. |
| 7,951,862 B2 | 5/2011 | Bloom et al. |
| 7,994,107 B2 | 8/2011 | Bloom |
| 8,034,172 B2 | 10/2011 | Naidoo et al. |
| 8,137,451 B2 | 3/2012 | Aerts et al. |
| 8,198,223 B2 | 6/2012 | Bloom |
| 8,198,224 B2 | 6/2012 | Bloom |
| 8,257,483 B2 | 9/2012 | Aerts et al. |
| 8,703,849 B2 | 8/2014 | Hagberg et al. |
| 8,808,445 B2 | 8/2014 | Coe |
| 8,814,464 B2 | 8/2014 | McDade et al. |
| 8,821,064 B1 | 9/2014 | Morris et al. |
| 8,926,742 B2 | 1/2015 | Coe |
| 9,000,196 B2 | 4/2015 | Hagberg et al. |
| 9,115,295 B2 | 8/2015 | Deneuvillers et al. |
| 9,139,733 B2 | 9/2015 | McDade et al. |
| 9,347,187 B2 | 5/2016 | Coe |
| 9,416,274 B2 | 8/2016 | Frank |
| 10,030,145 B2 | 7/2018 | Severance et al. |
| 10,119,026 B2 | 11/2018 | Gonzalez Leon et al. |
| 10,316,192 B2 | 6/2019 | Kurth et al. |
| 10,336,927 B2 | 7/2019 | Bahr |
| 10,570,286 B2 | 2/2020 | Williams et al. |
| 10,604,655 B2 | 3/2020 | Williams et al. |
| 10,899,928 B2 | 1/2021 | McCurdy et al. |
| 10,961,395 B2 | 3/2021 | Williams et al. |
| 11,193,243 B2 | 12/2021 | Chesky |
| 11,370,918 B2 | 6/2022 | Williams et al. |
| 11,773,265 B2 | 10/2023 | Cochran et al. |
| 11,958,974 B2 | 4/2024 | Williams et al. |
| 2002/0026884 A1 | 3/2002 | Raad |
| 2003/0088007 A1 | 5/2003 | Wool et al. |
| 2004/0025745 A1 | 2/2004 | Freisthler |
| 2004/0086335 A1 | 6/2004 | Thomas et al. |
| 2005/0038147 A1 | 2/2005 | Andersen |
| 2005/0148714 A1 | 7/2005 | Neimann |
| 2007/0275161 A1 | 11/2007 | Buras et al. |
| 2008/0108782 A1 | 5/2008 | Kazemizadeh |
| 2009/0137705 A1 | 5/2009 | Faucon Dumont et al. |
| 2009/0286896 A1 | 11/2009 | Roh et al. |
| 2010/0034586 A1 | 2/2010 | Bailey et al. |
| 2010/0040832 A1 | 2/2010 | Herbert |
| 2010/0168274 A1 | 7/2010 | Coe |
| 2010/0275817 A1 | 11/2010 | Williams et al. |
| 2010/0292492 A1 | 11/2010 | Geng et al. |
| 2012/0167802 A1 | 7/2012 | Huh |
| 2013/0022823 A1 | 1/2013 | Franks, Sr. |
| 2013/0160674 A1 | 6/2013 | Hong et al. |
| 2013/0171899 A1 | 7/2013 | Kalkanoglu et al. |
| 2013/0184383 A1 | 7/2013 | Cochran et al. |
| 2013/0186302 A1 | 7/2013 | Naidoo et al. |
| 2013/0239850 A1 | 9/2013 | Naidoo et al. |
| 2013/0295394 A1 | 11/2013 | Hong et al. |
| 2014/0000479 A1 | 1/2014 | Stevens et al. |
| 2014/0033951 A1 | 2/2014 | Ech et al. |
| 2014/0261076 A1 | 9/2014 | Quinn et al. |
| 2015/0225358 A1 | 8/2015 | Howard et al. |
| 2015/0337078 A1 | 11/2015 | Cochran et al. |
| 2016/0289971 A1 | 10/2016 | Becker, IV |
| 2016/0297969 A1 | 10/2016 | Naidoo et al. |
| 2016/0376440 A1 | 12/2016 | Naidoo et al. |
| 2017/0247542 A1 | 8/2017 | Williams et al. |
| 2017/0283615 A1 | 10/2017 | Williams et al. |
| 2018/0023259 A1 | 1/2018 | Kurth et al. |
| 2018/0030193 A1 | 2/2018 | Bloom et al. |
| 2018/0057686 A1 | 3/2018 | Williams et al. |
| 2018/0148575 A1 | 5/2018 | Kurth et al. |
| 2018/0171147 A1 | 6/2018 | Allen et al. |
| 2018/0209102 A1 | 7/2018 | Baumgardner et al. |
| 2018/0334603 A1 | 11/2018 | Bahr et al. |
| 2018/0340068 A1 | 11/2018 | McCurdy et al. |
| 2019/0048148 A1 | 2/2019 | Lalgudi |
| 2019/0152850 A1 | 5/2019 | Warner et al. |
| 2019/0242069 A1 | 8/2019 | Fennell et al. |
| 2019/0300714 A1 | 10/2019 | Watson et al. |
| 2020/0165459 A1 | 5/2020 | Williams et al. |
| 2021/0079224 A1 | 3/2021 | Cochran et al. |
| 2021/0115679 A1 | 4/2021 | Isazawa et al. |
| 2021/0130616 A1 | 5/2021 | Williams et al. |
| 2022/0033305 A1 | 2/2022 | Cochran et al. |
| 2024/0084141 A1 | 3/2024 | Cochran et al. |

FOREIGN PATENT DOCUMENTS

| | | |
|---|---|---|
| CN | 101694083 A | 4/2010 |
| CN | 101696097 A | 4/2010 |
| CN | 102092988 A | 6/2011 |
| CN | 102443271 A | 5/2012 |
| CN | 102702760 A | 10/2012 |
| CN | 102786806 A | 11/2012 |
| CN | 102838317 A | 12/2012 |
| CN | 102838874 A | 12/2012 |
| CN | 102964858 A | 3/2013 |
| CN | 102977620 A | 3/2013 |
| CN | 103102703 A | 5/2013 |
| CN | 103497521 A | 1/2014 |
| CN | 103602087 A | 2/2014 |
| CN | 103709415 A | 4/2014 |
| CN | 103788665 A | 5/2014 |
| CN | 103788667 A | 5/2014 |
| CN | 103980147 A | 8/2014 |
| CN | 104250520 A | 12/2014 |
| CN | 107163851 A | 9/2017 |
| DE | 19519539 A1 | 12/1995 |
| DE | 195 01 212 A1 | 6/1996 |
| DE | 196 01 495 A1 | 7/1997 |
| EP | 0568757 A1 | 11/1993 |
| EP | 0999237 A1 | 5/2000 |
| EP | 1524300 A1 | 4/2005 |
| EP | 1696002 A1 | 8/2006 |
| EP | 1717275 A1 | 11/2006 |
| EP | 2083050 A1 | 7/2009 |
| EP | 2245090 A1 | 11/2010 |
| FR | 2963354 A1 | 7/2010 |
| GB | 584344 | 1/1947 |
| GB | 610629 | 10/1948 |
| JP | 3158251 B2 | 7/2000 |
| JP | 2012046641 A | 3/2012 |
| JP | 5341892 B2 | 11/2012 |
| KR | 101166155 B1 | 7/2012 |
| KR | 101487180 B1 | 1/2015 |
| KR | 20200029045 A | 3/2020 |
| RU | 2461594 C1 | 9/2012 |
| WO | 91/09907 A1 | 7/1991 |
| WO | 93/00406 A1 | 1/1993 |
| WO | 97/35940 A1 | 10/1997 |
| WO | 00/20538 A1 | 4/2000 |
| WO | 2003093404 A1 | 11/2003 |

(56) References Cited

FOREIGN PATENT DOCUMENTS

| WO | 2006/107179 A2 | 10/2006 |
|---|---|---|
| WO | 2007/062158 A2 | 5/2007 |
| WO | 2009/102877 A1 | 8/2009 |
| WO | 2016/033603 A1 | 3/2016 |
| WO | 2016/033605 A1 | 3/2016 |
| WO | 2020/061030 A1 | 3/2020 |
| WO | 2020077213 A1 | 4/2020 |
| WO | 2020086558 A1 | 4/2020 |
| WO | 2021/055815 A1 | 3/2021 |

OTHER PUBLICATIONS

Wang et al., "Diffusion Mechanism of Rejuvenator and its Effects on the Physical and Rheological Performance of Aged Asphalt Binder," Materials 12:4130 (2019).

Khosla, N. P. "Effect of Emulsified Modifiers on the Characteristics of Recycled Mixtures," Association of Asphalt Paving Technologists Proceedings 51:522-539 (1982).

Zeng et al., "Effects of Various Rejuvenator Sealer Materials on Rheological Properties of Aged SBS Modified Asphalt," Key Engineering Materials 599:155-158 (2014).

King et al., "Spray Applied Polymer Surface Seals," Final Report, Foundation for Pavement Preservation/Federal Highway Administration, Washington, DC (2007).

Pan et al., "A Comprehensive Evaluation of Rejuvenator on Mechanical Properties, Durability, and Dynamic Characteristics of Artificially Aged Asphalt Mixture," Materials 11(9):1554 (2018).

Jamal et al., "Influence of Cereclor on the Performance of Aged Asphalt Binder," International Journal of Pavement Engineering 1-12 (2018).

Ghosh et al., "Laboratory and Field Investigation of the Effects of Biosealant Applications to the Surface of Asphalt Pavement," Journal of Materials in Civil Engineering 30(8):04018187 (2018).

Ghosh et al., "Rheological Characterization of Asphalt Binders Treated with Bio Sealants for Pavement Preservation," Canadian Journal of Civil Engineering 45(5):407-412 (2018).

Pan et al., "Effect of Healing Agents on Crack Healing of Asphalt and Asphalt Mortar," Materials 11:1373 (2018).

Babashamsi et al., "Recycling Toward Sustainable Pavement Development: End-of-Life Considerations in Asphalt Pavement," Jurnal Teknologi 78(7-2):25-32 (2016).

Jordan, W. S., "Laboratory Evaluation of Surface Treatments to Asphaltic Pavements in Mississippi," Thesis, Mississippi State University (2010).

Marotta, A., "Renewable Furan-Derived Epoxy Thermosets and Nanocomposites for Coating Applications," Thesis (2019).

Fuhaid et al. "Laboratory Evaluation of Biobased Epoxy Asphalt Binder for Asphalt Pavement," Journal of Materials in Civil Engineering 30(7): 06018007 (2018).

Ji et al., "Effectiveness of Vegetable Oils as Rejuvenators for Aged Asphalt Binders," Journal of Materials in Civil Engineering 29(3):D4016003 (2016).

Tarar et al., "Compatibility of Sunflower Oil with Asphalt Binders: A Way Toward Materials Derived from Renewable Resources," Materials and Structures 53:64 (2020).

Al Fuhaid et al., "Biobased Epoxy Asphalt Binder (BEAB) for Pavement Asphalt Mixtures," Thesis, University of South Florida (2018).

Xin et al., "Development and Evaluation of Porous Pavement Surface Mixtures with Bio-Based Epoxy Asphalt Binder," Center for Transportation, Environment, and Community Health (2019).

Bailey et al., "The Use of Vegetable Oil in Asphalt Mixtures, in the Laboratory and Field," The 5th Eurasphalt & Eurobitume Congress (2012).

International Search Report and Written Opinion for PCT/US2021/54549 (Mailed Feb. 14, 2022).

PubChem-CID-5280934 (Sep. 16, 2004).

Invitation to Pay Additional Fees for PCT/US2021/54549 (Mailed Dec. 15, 2021).

Office Action for U.S. Appl. No. 15/507,475, filed Apr. 11, 2019.

Restriction Requirement in U.S. Appl. No. 15/507,475, filed Nov. 5, 2018.

Office Action for U.S. Appl. No. 15/445,307, filed Jan. 11, 2019.

Elkashef et al., "Improving Fatigue and Low Temperature Performance of 100% RAP Mixtures Using a Soybean-Derived Rejuvenator," Construction and Building Materials 151:345-352 (2017).

Elkashef et al., "Preliminary Examination of Soybean Oil Derived Material as a Potential Rejuvenator Through Superpave Criteria and Asphalt Bitumen Rheology," Construction and Building Materials 149:826-836 (2017).

Elkashef et al., "Instroducing a Soybean Oil-Derived Material as a Potential Rejuvenator of Asphalt Through Rheology, Mix Characterisation and Fourier Transform Infrared Analysis," Road Materials and Pavement Design 19(8):1750-1770 (2018).

Material Safety Data Sheet for Epoxidized Isoamyl Soyate, Revision Date: Feb. 5, 2010.

Material Safety Data Sheet for Glycerin Removal Column Bottoms, Revision Date: Feb. 29, 2012.

Material Safety Data Sheet for MONG, Revision Date: Oct. 11, 2012.

Material Safety Data Sheet for Mixed Short Chain Polyols, Revision Date: Mar. 25, 2011.

Material Safety Data Sheet for Adm CA118, Revision Date: Jun. 25, 2014.

Material Safety Data Sheet for Alinco Z-2 Z-3 Linseed Oil, Revision Date: Feb. 12, 2014.

Material Safety Data Sheet for Oko M-37 Linseed Oil, Issue Date: Jul. 10, 2002.

Material Safety Data Sheet for Toplin X-Z Linseed Oil, Issue Date: Aug. 18, 2005.

International Search Report and Written Opinion for Application No. PCT/US2015/047798 (mailed Dec. 9, 2015).

Kim, Y.R., "Program Book of the 12th ISAP Conference on Asphalt Pavements," 12th ISAP Conference, Jul. 1, 2014, Raleigh, North Carolina.

Podolsky et al., "Investigation of Bio-Derived Materials Including Isosorbide-Based Materials as Bio-Based Warm Mix Asphalt Additives," Poster Presentation ISAP 2014 Conference, Jun. 5, 2014, p. 1, Raleigh, North Carolina.

Preliminary Agenda and Abstracts of the 51st Petersen Asphalt Research Conference, Wyoming Conference Center (Jul. 16, 2014).

International Search Report and Written Opinion for corresponding Application No. PCT/US2015/047810 (mailed Dec. 3, 2015).

Podolsky et al., "Comparative Performance of Bio-Derived/ Chemical Additives in Warm Mix Asphalt at Low Temperature," 51st Annual Petersen Asphalt Research Conference, Iowa State University (Jul. 16, 2014).

Office Action for U.S. Appl. No. 15/691,295, filed Apr. 4, 2019.

Office Action for U.S. Appl. No. 15/445,307, filed Jul. 25, 2019.

Sharma et al., "Oxidation, Friction Reducing, and Low Temperature Properties of Epoxy Fatty Acid Methyl Esters," Green Chemistry 9:469-474 (2007).

Perkins E.G "Chapter 2. Composition of Soybeans and Soybean Products," Practical Handbook of Soybean Processing and Utilization, AOCS Press, p. 9-28 (1995).

Sahoo et al., "Toughened Bio-Based Epoxy Blend Network Modified With Transesterified Epoxidized Soybean Oil: Synthesis and Characterization," RSC Adv. 5:13674-13691 (2015).

Office Action for U.S. Appl. No. 15/445,307, filed Mar. 6, 2020.

International Search Report and Written Opinion for Application No. PCT/US2019/051490 (mailed Jan. 14, 2020).

International Preliminary Report on Patentability for Application No. PCT/US2019/051490 (Mar. 25, 2021).

"Oxirane Oxygen in Epoxidized Materials," American Oil Chemists' Society (2017).

International Search Report and Written Opinion for Application No. PCT/US2020/051588 (Dec. 23, 2020).

International Preliminary Report on Patentability for Application No. PCT/US2015/047810 (mailed Feb. 28, 2017).

U.S. Appl. No. 17/140,465 to Williams et al. filed Jan. 4, 2021, first named inventor Ronald Christopher Williams.

(56) References Cited

OTHER PUBLICATIONS

U.S. Appl. No. 17/275,500 to Cochran et al. filed Mar. 11, 2021, first named inventor Eric W. Cochran.
Biresaw, G., et al., "Elastohydrodynamic Properties of Biobased Heat-Bodied Oils," Ind. Eng. Chem. Res. 53:16183-16195 (2014).
Erhan, S. Z., et al., "Vegetable Oil-Based Printing Inks," J. Am. Oil Chem. Soc. 69:251-256 (1992).
Erhan, S. Z., et al., "Lithographic and Letterpress Ink Vehicles from Vegetable Oils," J. Am. Oil Chem. Soc. 68:635-638 (1991).
Mitchell, J., et al., "Ultraviolet Absorption Spectra of Linseed Oil: Determination of Bodied-in-Vacuo and Blown inseed Oil in Mixtures with Raw Linseed Oil," Ind. Eng. Chem. Anal. Ed. 13:765-768 (1941).
Black, M. M. et al., "South African Fish Products. XXXI.—The Composition of Pilchard Oil and of Maasbanker Oil," J. Sci. Food Agric. 1:248-251 (1950).
Standard Test Method for Viscosity of Transparent Liquids by Bubble Time Method. (ASTM International) (2017).
Paschke, et al., "Inter- and Intramolecular Polymerization in Heat-Bodied Linseed Oil," J. Am Oil Chem Soc. 31:208-211 (1954).
Test Method for Viscosity of Transparent Liquids by Bubble Time Method. (ASTM International), 1545-13R17 (see Iodine value. Wikipedia (2020) available at: https://en.wikipedia.org/w/index.php?title=Iodine_value&oldid=960069598. (Accessed: Sep. 8, 2020).
Office Action for U.S. Appl. No. 16/751,520, filed Sep. 16, 2021.
Wang et al. "Micro-Surfacing Mixtures with Reclaimed Asphalt Pavement: Mix Design and Performance Evaluation," Construction and Building Materials 201:303-313 (2019).
Sun et al. "Optimization of Synthesis Technology to Improve the Design of Asphalt Self-Healing Microcapsules," Construction and Building Materials 175:88-103 (2018).
Chiu et al., "Effectiveness of Seal Rejuvenators for Bituminous Pavement Surfaces," Journal of Testing and Evaluation 34(5):390-394 (2006).
Liu et al., "Effects of Emulsifier Dosage and Curing Time on Self-Healing Microcapsules Containing Rejuvenator and Optimal Dosage in Asphalt Binders," Journal of Nanoscience and Nanotechnology 19(1):57-65 (2019).
Muncy, Steven G. "Classification of Emulsified Recycling Agents," Asphalt Emulsions, ASTM International, p. 36-43 (1990).
International Search Report and Written Opinion for Application No. PCT/US2023/030218 (Jan. 18, 2024).
Office Action for U.S. Appl. No. 17/275,500, filed Apr. 11, 2024.
Yang and You, "New Predictive Equations for Dynamic Modulus and Phase Angle Using a Nonlinear Least-Squares Regression Model," Journal of Materials in Civil Engineering 27(3):04014131-1 thru 04014131-8 (2015).
Yan et al., "Gel Point Suppression in RAFT Polymerization of Pure Acrylic Cross-Linker Derived from Soybean Oil," Biomacromolecules 17:2701-2709 (2016).
Wang et al., "Investigating the Interactions of the Saturate, Aromatic, Resin, and Asphaltene Four Fractions in Asphalt Binders by Molecular Simulations," Energy Fuels 29:112-121 (2015).
Wang et al., "Effects of SARA Fractions on Low Temperature Properties of Asphalt Binders," Road Materials and Pavement Design (2019).
Tadros, "Emulsion Formation, Stability, and Rheology," Wiley-VCH Verlag GmbH and Co. (2013).
"Roads," Infrastructure Report Card, pp. 76-80 (2017).
Podolsky et al., "Effect of Corn and Soybean Oil Derived Additives on Polymer-Modified HMA and WMA Master Curve Construction and Dynamic Modulus Performance," International Journal of Pavement Research and Technology 11:541-552 (2018).
Podolsky et al., "Effect of Bio-Derived/Chemical Additives on Warm Mix Asphalt Compaction and Mix Performance at Low Temperature," Cold Regions Science and Technology 136:52-61 (2017).
Pellinen and Witczak, "Stress Dependent Master Curve Construction for Dynamic (Complex) Modulus," School of Engineering, Purdue University pp. 281-309 (2002).
"Engineering Overview," National Asphalt Pavement Association (2020).
Li et al., "Mechanistic-based Comparisons for Freeze-thaw Performance of Stabilized Unpaved Roads," Cold Regions Science and Technology 141:97-108 (2017).
Elkashef et al., "Using Viscosity Models to Predict the Properties of Rejuvenated Reclaimed Asphalt Pavement (RAP) Binders," Road Materials and Pavement Design pp. 1-13 (2019).
Elkashef et al., "Investigation of Fatigue and Thermal Cracking Behavior of Rejuvenated Reclaimed Asphalt Pavement Binders and Mixtures," International Journal of Fatigue 108:90-95 (2018).
Booij and Thoone, "Generalization of Kramers-Kronig Transforms and Some Approximations of Relations Between Viscoelastic Quantities," Rheol. Acta 21:15-24 (1982).
Barnes, "Rheology of Emulsions—A Review," Colloids Surfaces A: Physicochem. Eng. Aspects 91:89-95 (1994).
"Alternatives to Seal Coats," Transportation Research Synthesis, Local Road Research Board, Minnesota Department of Transportation TRS 1602 pp. 1-44 (Feb. 2016).
Material Safety Data Sheet for Glycerin Removal col. Bottoms, Revision Date: Feb. 29, 2012.
Brownridge, J. "Fog Seal, Scrub Seal, Rejuvenator: Benefits and Differences," (2016).
Ghosh et al., "Evaluation of Bio-Fog Sealants for Pavement Preservation," Minnesota Department of Transportation (2016).
International Preliminary Report on Patentability for PCT/US2021/054549 (mailed Apr. 27, 2023).
Office Action for European Patent Application No. 20786155.0 (Dated Apr. 24, 2023).
International Preliminary Report on Patentability for PCT/US2020/051588 (Mar. 15, 2022).
International Preliminary Report on Patentability for PCT/US2015/047798 (Mar. 9, 2017).
Office Action for U.S. Appl. No. 17/140,465, filed Oct. 27, 2022.
Office Action for U.S. Appl. No. 17/025,625, filed Dec. 21, 2022.
Kuang et al., "Diffusibility Enhancement of Rejuvenator by Epoxidized Soybean Oil and Its Influence on the Performance of Recycled Hot Mix Asphalt Mixtures," Materials 11:833 (2018).
Invitation to Pay Additional Fees for PCT/US2023/030218 (mailed Nov. 6, 2023).
Office Action for Brazil Patent Application No. 1120220049358 (Oct. 17, 2023).
Notice of Allowance for U.S. Appl. No. 17/140,465, filed Dec. 13, 2023.
International Preliminary Report on Patentability for Application No. PCT/US2021/054549 (Apr. 27, 2023).
Final Office Action for U.S. Appl. No. 17/275,500, filed Nov. 21, 2024.
Khot et al., "Development and Application of Triglyceride-Based Polymers and Composites," J. Appl. Polym. Sci. 82:703-23 (2001).
Bonnaillie et al., "Thermosetting Foam with a High Bio-Based Content from Acrylated Epoxidized Soybean Oil and Carbon Dioxide," J. Appl. Polym. Sci. 105:1042-52 (2007).
Matsumoto et al., "Approach to Ideal Network Formation Governed by Flory-Stockmayer Gelation Theory in Free-Radical Cross-Linking Copolymerization of Styrene with m-Divinylbenzene," Macromolecules 32:8336-39 (1999).
Wang et al., "Branching and Gelation in Atom Transfer Radical Polymerization of Methyl Methacrylate and Ethylene Glycol Dimethacrylate," Polym. Eng. Sci. 45: 720-27 (2005).
Gao et al., "Gelation in ATRP Using Structurally Different Branching Reagents: Comparison of Inimer, Divinyl and Trivinyl Cross-Linkers," Macromolecules 42:8039-43 (2009).
Yu et al., "Reaction Behavior and Network Development in RAFT Radical Polymerization of Dimethacrylates," Macromol. Chem. Phys. 209:551-56 (2008).
Moad, "RAFT (Reversible Addition-Fragmentation Chain Transfer) Crosslinking (Co)Polymerization of Multi-Olefinic Monomers to Form Polymer Networks," Polym. Int. 64:15-24 (2015).

(56) References Cited

OTHER PUBLICATIONS

Yu et al., "Comparison of Reaction Kinetics and Gelation Behaviors in Atom Transfer, Reversible Addition—Fragmentation Chain Transfer and Conventional Free Radical Copolymerization of Oligo(ethylene glycol) Methyl Ether Methacrylate and Oligo(ethylene glycol) Dimethacrylate," Polymer 50:3488-94 (2009).
Vo et al., "RAFT Synthesis of Branched Acrylic Copolymers," Macromolecules 40:7119-25 (2007).
Lin et al., "Gelation Suppression in RAFT Polymerization", Macromolecules 52:7005-15 (2019).
International Preliminary Report on Patentability for Application No. for PCT/US2023/030218 (Feb. 27, 2025).
English Translation of Office Action for Brazil Patent Application No. 1120220049358 (Mar. 7, 2025).
Extended European Search Report for European Patent Application No. 21880899.6 (Feb. 5, 2025).

(a)

MAINTENANCE TREATMENTS USEFUL FOR IMPROVING THE PERFORMANCE OF AGED OR BRITTLE RESINOUS BINDERS IN PAVING OR ROOFING

FIELD

The present application is directed to maintenance treatments useful for improving the performance of aged or brittle resinous binders in paving or roofing.

BACKGROUND

Asphalt is one of the most important construction materials globally. The co-product of the crude oil refining process, asphalt is a broad classification of resinous binder containing a complex heterogeneous mixture of heavy hydrocarbons. Resinous binders such as the bio-oils produced from the fast pyrolysis of biomass have similar characteristics as asphalt; in the following discussion such binders are implicitly considered as a type of asphalt. The primary uses for asphalt are in binding of aggregates to yield pavements and shingles as well as maintenance applications. Asphalt-containing products are subjected to severe stresses over their lifetime from users and the environment. These stresses ultimately lead to product failure, creating unacceptable cost, liability, and waste.

For example, in the United States, 94% of the 2.7 million lane miles of paved roadways feature asphalt surfaces. As stated in the ASCE 2017 Infrastructure Report Card on Roads, "America's roads are often crowded, frequently in poor condition, chronically underfunded, and are becoming more dangerous." In 2014 alone, congestion and traffic delays accounted for $160 billion in lost time and fuel. Such delays are in part due to the poor condition impacting 20% of all roadways, highlighting the need for the rehabilitation of infrastructure. With tight and shrinking budgets for maintenance, rehabilitation and reconstruction becomes an increasingly impractical solution. On the other hand, pavement preservation and maintenance treatments can be applied at orders-of-magnitude lower cost. With respect to shingles, $37.4 bn worth of asphalt shingles are produced each year. At the end of life, shingles are largely discarded due to their reduced quality. The extension of shingle lifetime through improved maintenance practices has tremendous potential to save cost and reduce landfilling.

The end-of-life in both asphalt shingles and pavements is largely a consequence of the oxidative aging of the asphalt binder component. This aging causes embrittlement and reduces the adhesion between the binder and aggregate, leading to cracking and disengagement of the aggregate particles. At a chemical level, the mechanisms of oxidative aging are poorly understood, although it is believed that the oxidation of polyaromatics causes their agglomeration, reducing ductility. A key objective of maintenance products is therefore to reduce this loss of ductility and adhesion with the aggregate matrix; such products are often termed "rejuvenators" for their intended function of reversing these effects of aging. Mechanistically, rejuvenators can function through physical and/or chemical interactions. Physical interactions include plasticization via non-volatile solvents; this action can temporarily restore ductility although leaching limits long-term benefit. Additionally, plasticization mainly targets the resinous and maltene components of asphalt, leaving the crack-prone asphaltene agglomerates unaffected. Alternatively, chemical interactions involve reactive combination with asphaltenes to permanently alter the morphology, ideally weakening the asphaltene-asphaltene interactions that stabilize agglomeration.

To date, all commercial maintenance products function solely through physical mechanisms and thus fail to effectuate long-term rejuvenation effects. Alarmingly, many such products have no statistically detectable influence on properties only nine months after application. To distinguish dual-mechanism rejuvenators from purely physical mechanism materials, the former are referred to as restorative reactive modifiers (RRM). For a maintenance product to be considered an RRM, there must be evidence of chemical interactions occurring between the different asphalt components.

A recently discovered RRM family is comprised of sub-epoxidized soybean oils (SESOs), which enable high utilization rates of recycled bituminous pavements in new construction without compromising susceptibility to rutting and cracking. Disclosed herein is the further utility of these new RRMs in the development of maintenance applications for asphalt-based materials like pavements and shingles. The formulations comprise various mixtures of SESO, water, asphalt, dyes, polymers and surfactants: fog seals, cutbacks, seal coats, prime coats, tack coats, chip seals, slurry seals and spray treatments. These various implementations all leverage the unique behavior of RRMs such as SESO, acrylated epoxidized soybean oil (AESO) or epoxidized methyl soyate (EMS) which penetrate deeply into aged asphalt to dissociate asphaltene agglomerates through chemically mediated interactions; these interactions permanently increase ductility and reduce crack susceptibility.

Maintenance treatments like fog seals and spray treatments are oil-water emulsions. Oil phases containing asphalt are commonly used treatments designed for pavement preservation. Asphalt emulsions are prepared both as oil-in-water and water-in-oil emulsions. In an oil-in-water emulsion, the asphalt droplets are the dispersed phase (oil), while the water is the continuous phase. Asphalt emulsions (AEs) are useful for maintenance treatments since they are processable at ambient temperatures with minimal requirements for handling, storage and application. They are produced by intensively shearing a hot asphalt formulation with water and surfactant in a specially designed emulsion mill. The surfactant serves as an emulsifying agent in the water phase that stabilizes the asphalt droplets. The properties and performance of AEs depend on a number of chemical and physical factors, the most important of which are the particle size, emulsifier content and type. Emulsifiers may either be cationic or anionic corresponding to the hydrophilic head group. The lipophilic tail group of the surfactant anchors in the surface of an asphalt droplet such that the charged head group stabilizes the oil/water interface. The head group imparts a net charge to the droplet, yielding a repulsive interparticle electrostatic force that promotes stability, counteracting van-der-Waals attractive forces which promote flocculation. The particle size distribution (PSD) of the asphalt emulsion affects its stability and viscosity. The emulsion viscosity is inversely correlated with mean size and directly correlated with the size dispersity. Emulsions with smaller particle sizes tend to be more stable, since they are less prone to sedimentation and phase separation. Particle size can be controlled by physical factors like shearing time and shear rate, or through the formulation variables. For example, the particle size is inversely correlated with the emulsifier concentration due to its tendency to increase the specific surface area. When an asphalt emulsion is applied to a bituminous pavement surface, it is said to be "set" when the asphalt particles have completely flocculated ("broken")

and adhered to the existing bituminous pavement surface; the surfactant-aggregate interaction and the evaporation of the water phase are components of this process. One-way AEs are categorized is through the rate of the "setting" process. A slow-setting AE is formulated to maintain its stability immediately after application and sets primarily through the evaporation process. While slow-set designs require the treatment area to be out-of-service for longer durations, the additional time allows for greater penetration into the treatment surface. Quick-setting emulsions break nearly immediately on contact with exposed aggregate surface. Quick-setting emulsions are formulated with surfactants opposite in charge to the aggregate surface such that it competes with the aqueous phase for surfactant, leading to destabilization.

Slow setting emulsions are often made with emulsifiers that can be derived from fatty amines. These emulsifiers consist of a lipophilic tail group and a hydrophilic head group. Emulsifiers are generally alkaline in nature and increase the pH of the soap solution when added to water. In order to impart a positive charge to the emulsifier molecules, an acid is added to the soap solution to reduce solution pH. Addition of an acid leads to protonation of the emulsifier molecules as they receive a H+ ion (proton) from the aqueous solution. While the positive charged parts of the emulsifier molecule attach themselves to the asphalt droplet, the negative charged ions remain in aqueous solution. The difference in potential between the droplet surface charges and charges in solution is known as the Zeta potential (ZP) and plays a large role in emulsion stability. Slow setting emulsions have high zeta potentials, with cationic slow setting emulsions having large positive values of ZP while anionic slow sets have large negative values of ZP. Therefore, to formulate a slow setting emulsion capable of penetrating the bituminous pavement surface and rejuvenating the aged asphalt, the emulsion must have a small particle size distribution, have a high storage stability, and not react with aggregates on contact.

AEs have a broad application in many pavement preservation treatments. The ease at which emulsions can be applied on a bituminous pavement surface at room temperature gives them an advantage as a material to be used for pavement preservation applications. Regarding rejuvenation of old asphalt, a rejuvenating emulsion can be applied as a "fog seal" treatment which can help the rejuvenator penetrate into and soften the existing binder. Fog seals are a low-cost treatment using a slow setting asphalt emulsion that is applied on the surface of an aged pavement to restore its flexibility and mitigate cracking. They are often used to extend the life of a pavement by 2-3 years and delay the application of more expensive treatments. Pavements will deteriorate with time, requiring further interventions to prevent rapid structural and functional degradation and a more expensive prognosis.

The effect of rejuvenators on bituminous pavements can be measured by friction tests and by testing cores taken from the treated roadway. Friction tests are conducted by several test methods which include the dynamic friction tester, the locked wheel tester, and the British pendulum skid resistance tester. Studies done by the University of California Pavement Research Center show that the coefficient of friction initially decreases after application of a fog seal, which is why sanding the pavement to provide vehicles with temporary friction is recommended. DSR tests on binder recovered from coring pavements treated with a rejuvenator showed that rejuvenators softened the pavement binder. This was achieved by comparing the performance grade (PG) of the aged binder with that of the treated binder. It is for this reason that the penetrating power of a rejuvenating treatment is of great importance. Several studies have shown that rejuvenators are effective at softening aged asphalt and show promise in the field of pavement preservation.

A traditional asphalt cutback consists of an asphalt binder that has been dissolved in a volatile organic chemical (VOC) solvent. Asphalt cutbacks are typically avoided due to environmental and safety concerns. Historically cutbacks were used for paving low volume roads in the 1920's by mixing the cutback with aggregate and grading the road surface. The VOC solvent would evaporate, and traffic would compact the pavement to form a roadway. Cutbacks were used in prime coats, tack coats, fog seals, and slurry seals as well. See FIG. 1, prime coat is a coating that is applied directly to the pavement's prepared base before additional layers of support are placed, they help protect the substrate and are one of the most important elements that affect the final physical properties of the asphalt product. Tack coats are a thin layer of asphalt applied between layers of bituminous pavement to bond them together. Slurry seals are similar to a fog seal, except with the addition of small aggregates to form a thin layer of new bituminous pavement over the old pavement. Current use of traditional cutbacks is limited mostly to cold weather patching. A modern cutback alternative substitutes the VOC solvent for a non-volatile rejuvenating oil. A well-performing oil diffuses deeply into the pavement while the asphalt component concentrates near the bituminous pavement surface where it arrests loosened aggregate. Modern cutbacks are far more environmentally benign, especially when based on bio-based rejuvenating oils.

The effectiveness of these maintenance technologies depends greatly on the rejuvenating oil. Irrespective of the delivery mechanism, the role of the rejuvenator is to reverse the effects of oxidative aging on the thermoplastic resinous binder. While physical rejuvenators temporarily emulate this reversal, only RRMs have the potential for longer-term service life extension. Disclosed herein are several maintenance treatments featuring EMS and SESO, that have already proven to be highly effective in the extension of RAP utilization in the design of new pavement mixes. Surprisingly, unlike new pavement production where elevated temperatures rapidly activate oxirane-asphaltene bonding cascades, EMS, SESO, and AESO also exhibit RRM characteristics under the far milder conditions associated with maintenance treatments.

SUMMARY

Pavements and roofing systems often use mineral aggregates bound by a thermoplastic resinous binder such as asphalt. These binders undergo oxidative aging that causes embrittlement, cracking, and loss of adhesion between the binder and aggregate phases. Maintenance products that prevent and/or reverse embrittlement will extend the service life, reducing the cost-of-ownership and waste generation. Disclosed herein are several compositions comprising epoxidized or partially epoxidized triglycerides that are highly effective in this regard, suitable for the formulation of maintenance treatment categories including "fog seals," "cutbacks," "seal coats," "prime coats," "tack coats," "chip seals," and "slurry seals." These formulations can be used to preserve and rejuvenate roads, runways, parking lots, racetracks, cycling paths, asphalt shingles, roofing sealants, and related products that feature resinous binders. Surprisingly, optimization of the oxirane content of the epoxidized triglyceride enables treatments to maximize the compatibility with aged binders while providing chemical reactivity that permanently modifies the binder performance.

One embodiment of the present application relates to an emulsified asphalt product that includes water, one or more surfactants, one or more binders, and one or more rejuvenators of formula (I) or formula (X). When combined these components form an emulsion.

In another embodiment the emulsified asphalt product may optionally include any of the following: reclaimed asphalt product (RAP), one or more polymers, one or more aggregates, one or more colorants, one or more antimicrobials, and combinations thereof.

Another embodiment of the present application relates to an emulsified coating product that includes water, one or more surfactants, one or more rejuvenators of formula (I) or formula (X), and wherein the one or more rejuvenators of formula (I) or formula (X) have an $N_e$ value which is greater than about 1.0 and an $N_d$ value less than about $N_{d,0}-1$. When combined these components form an emulsion.

In another embodiment the emulsified coating product may optionally include any of the following: one or more binders, one or more polymers, one or more colorants, one or more antimicrobials, one or more aggregates, one or more stabilizing or gelling agents, one or more crosslinkers, one or more antistripping agents, one or more wetting agents, and combinations thereof.

Another embodiment of the present application is a method of treating a bituminous pavement surface comprising contacting a pavement, having a surface and a depth extending below the surface, with the emulsified asphalt product disclosed herein.

In another embodiment of the method of treating a bituminous pavement, the pavement has a concentration of the emulsified asphalt product which is higher at the bituminous pavement surface than at a depth of a percentage of the pavement depth. In another embodiment the pavement has a concentration of the one or more rejuvenators of formula (I) or formula (X), concentration of one or more polymers, or one or more colorants which is higher at the bituminous pavement surface that at a depth of a percentage of the pavement depth. In another embodiment, aggregate adheres to the surface of the pavement. In some embodiments, the method of treating is fog sealing, chip sealing, tack coating, prime coating, slurry sealing, microsurfacing, and a combination thereof.

Another embodiment of the present application is a method of treating an asphalt roofing system comprising contacting an asphalt roofing system with the emulsified coating product disclosed herein.

Another embodiment of the present application relates to a treated bituminous pavement comprising an bituminous pavement, having a surface and depth extending to a pavement bottom, and a treatment coating on the surface of the asphalt comprising one or more binders and one or more rejuvenators of formula (I) or formula (X), where the combined components of the treatment coating form an emulsion.

The present application provides compositions and methods for the preservation and maintenance of bituminous pavement and roofing. Extending the life of pavement or roofing before damage starts occurring can significantly lengthen the service life of these materials.

DETAILED DESCRIPTION

Figure 1:
FIG. 1 shows different pavement layers with the different interfacial treatments.

The above disclosure generally describes the present application. A more specific description is provided below in the following examples. The examples are described solely for the purpose of illustration and are not intended to limit the scope of the present application. Changes in form and substitution of equivalents are contemplated as circumstances suggest or render expedient. Although specific terms have been employed herein, such terms are intended in a descriptive sense and not for purposes of limitation.

Definitions

The term "alkyl" means an aliphatic hydrocarbon group which may be straight or branched having about 1 to about 23 carbon atoms in the chain. For example, straight or branched carbon chain could have 1 to 10 carbon atoms. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

The term "aryl" means an aromatic monocyclic or multi-cyclic ring system of 6 to about 14 carbon atoms, preferably of 6 to about 10 carbon atoms. Representative aryl groups include phenyl and naphthyl.

The term "arylalkyl" means an alkyl substituted with one or more aryl groups, wherein the alkyl and aryl groups are as herein described. One particular example is an arylmethyl or arylethyl group, in which a single or a double carbon spacer unit is attached to an aryl group, where the carbon spacer and the aryl group can be optionally substituted as described herein. Representative arylalkyl groups include

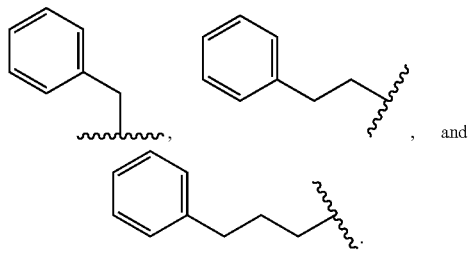

The term "benzyl" means a benzyl group as shown below

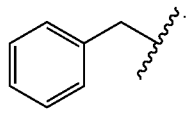 [SMILES: *Cc1ccccc1]

The term "heteroaryl" means an aromatic monocyclic or multi-cyclic ring system of about 5 to about 14 ring atoms, preferably about 5 to about 10 ring atoms, in which one or more of the atoms in the ring system is/are element(s) other than carbon, for example, nitrogen, oxygen, or sulfur. In the case of multi-cyclic ring system, only one of the rings needs to be aromatic for the ring system to be defined as "Heteroaryl". Preferred heteroaryls contain about 5 to 6 ring atoms. The prefix aza, oxa, thia, or thio before heteroaryl means that at least a nitrogen, oxygen, or sulfur atom, respectively, is present as a ring atom. A nitrogen atom of a heteroaryl is optionally oxidized to the corresponding N-oxide. Representative heteroaryls include pyridyl, 2-oxopyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, pthalazinyl, quinoxalinyl, 2,3-dihydro-benzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like.

As used herein, "heterocyclyl" or "heterocycle" refers to a stable 3- to 18-membered ring (radical) which consists of carbon atoms and from one to five heteroatoms selected from the group consisting of nitrogen, oxygen and sulfur. For purposes of this application, the heterocycle may be a monocyclic, or a polycyclic ring system, which may include fused, bridged, or spiro ring systems; and the nitrogen, carbon, or sulfur atoms in the heterocycle may be optionally oxidized; the nitrogen atom may be optionally quaternized; and the ring may be partially or fully saturated. Examples of such heterocycles include, without limitation, oxiranyl, azepinyl, azocanyl, pyranyl dioxanyl, dithianyl, 1,3-dioxolanyl, tetrahydrofuryl, dihydropyrrolidinyl, decahydroisoquinolyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, 2-oxoazepinyl, oxazolidinyl, oxiranyl, piperidinyl, piperazinyl, 4-piperidonyl, pyrrolidinyl, pyrazolidinyl, thiazolidinyl, tetrahydropyranyl, thiamorpholinyl, thiamorpholinyl sulfoxide, and thiamorpholinyl sulfone. Further heterocycles and heteroaryls are described in Katritzky et al., eds., *Comprehensive Heterocyclic Chemistry: The Structure, Reactions, Synthesis and Use of Heterocyclic Compounds*, Vol. 1-8, Pergamon Press, N.Y. (1984), which is hereby incorporated by reference in its entirety.

The term "monocyclic" used herein indicates a molecular structure having one ring.

The term "polycyclic" or "multi-cyclic" used herein indicates a molecular structure having two or more rings, including, but not limited to, fused, bridged, or spiro rings.

The term "epoxide" or "oxirane" includes an epoxide ring (i.e., group) as shown below:

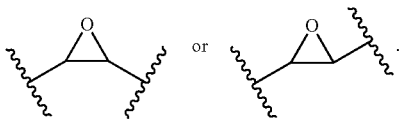 [SMILES: *C1OC1* ; *C1OC1*]

The term "substituted" or "substitution" of an atom means that one or more hydrogen on the designated atom is replaced with a selection from the indicated group, provided that the designated atom's normal valency is not exceeded.

The term "optionally substituted" is used to indicate that a group may have a substituent at each substitutable atom of the group (including more than one substituent on a single atom), provided that the designated atom's normal valency is not exceeded, and the identity of each substituent is independent of the others. Up to three H atoms in each residue are replaced with alkyl, halogen, haloalkyl, hydroxy, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy.

"Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture, and formulation into an efficacious therapeutic agent.

As used herein, the term "performance grade" means the high and low temperature ratings for an asphalt binder as determined by the American Association of State Highway and Transportation Officials M 320 testing standard. Binders graded according to this standard are described as PGHL, where H is a high temperature limit such that H=52+6h, where h is an integer, and L is a low temperature limit such that L=−4−6l, where l is an integer.

Compositions

The present application relates to one or more rejuvenators of formula (I)

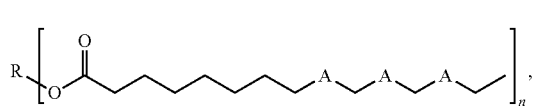

wherein:

each A is selected independently at each occurrence thereof from the group consisting of

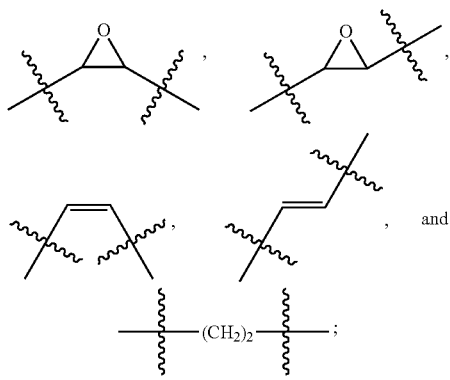

wherein at least one A is

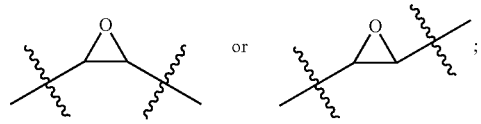 [SMILES: *C1OC1* ; *C1OC1*]

each

represents the point of attachment to a —CH$_2$— group;

n is 1, 2, or 3;

R is selected from the group consisting of H, C$_1$-C$_{23}$ alkyl, and benzyl, wherein the C$_1$-C$_{23}$ alkyl can be optionally substituted with an aryl, heteroaryl, or heterocyclyl; or R is selected from the group consisting of

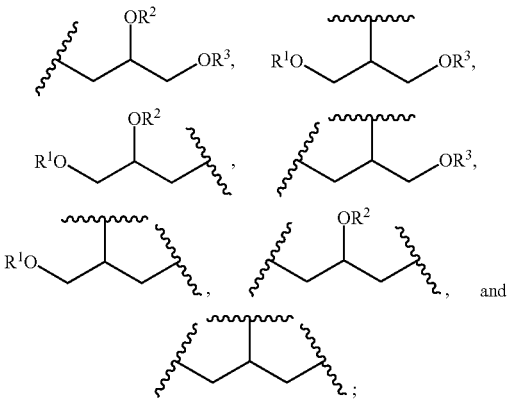

each

represents the point of attachment to a

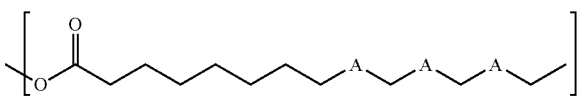

moiety;

R$^1$, R$^2$, and R$^3$ are independently selected from the group consisting of —H and —C(O)R$^4$;

R$^4$ is H, C$_1$-C$_{23}$ alkyl, or aryl.

The present application also relates to one or more rejuvenators of formula (X)

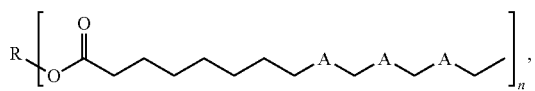

wherein:

each A is selected independently at each occurrence thereof from the group consisting of

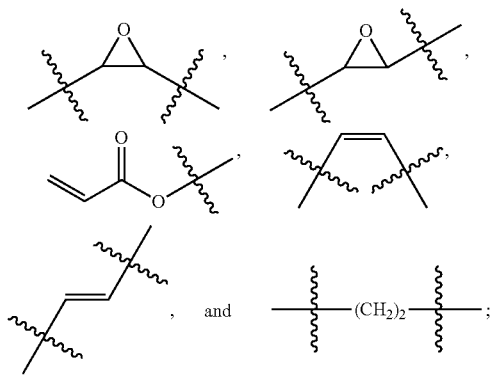

wherein at least one A is

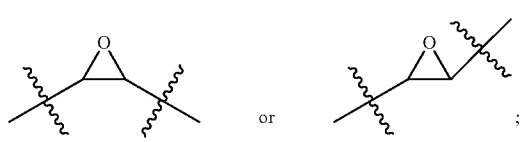 [SMILES: *C1OC1* ; *C1OC1*]

each

represents the point of attachment to a —CH₂— group;

n is 1, 2, or 3;

R is selected from the group consisting of H, $C_1$-$C_{23}$ alkyl, and benzyl, wherein the $C_1$-$C_{23}$ alkyl can be optionally substituted with an aryl, heteroaryl, or heterocyclyl; or R is selected from the group consisting of

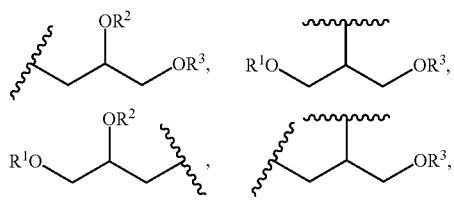

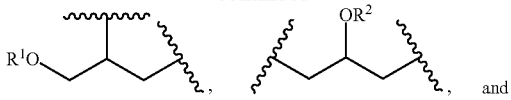

and each

represents the point of attachment to a

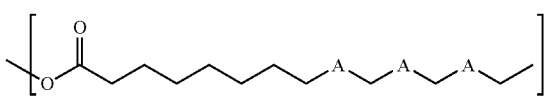

moiety;

$R^1$, $R^2$, and $R^3$ are independently selected from the group consisting of —H and —C(O)$R^4$;

$R^4$ is H, $C_1$-$C_{23}$ alkyl, or aryl.

The one or more rejuvenators of formula (I) or formula (X) described herein may contain one or more epoxide (oxirane) rings, and unless specified otherwise, it is intended that the compounds include both cis- or trans-isomers and mixtures thereof. When the compounds described herein contain olefinic double bonds or other centers of geometric asymmetry, and unless specified otherwise, it is intended that the compounds include both E and Z geometric isomers.

The one or more rejuvenators of formula (I) or formula (X) may include, for example, epoxidized methyl soyate (EMS), epoxidized benzyl soyate (EBS), sub-epoxidized soybean oil (SESO), epoxidized soybean oil (ESO), acrylated epoxidized soybean oil (AESO), epoxidized isoamyl soyate, sub-epoxidized corn oil, epoxidized corn oil, sub-epoxidized rapeseed oil, epoxidized rapeseed oil, sub-epoxidized linseed oil, and epoxidized linseed oil.

The one or more rejuvenators of formula (I) or formula (X) described herein may contain one or more epoxide (oxirane) rings, and unless specified otherwise, it is intended that the compounds include both cis- or trans-isomers and mixtures thereof. When the one or more rejuvenators of formula (I) or formula (X) described herein contain olefinic double bonds or other centers of geometric asymmetry, and unless specified otherwise, it is intended that the compounds include both E and Z geometric isomers.

In one embodiment, the one or more rejuvenators of formula (I) or formula (X) is the compound of any one of Formulae (Ia)-(Ik) or any combination thereof:

(Ia)

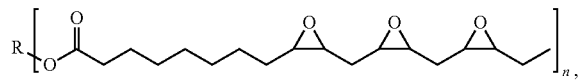

(Ib)

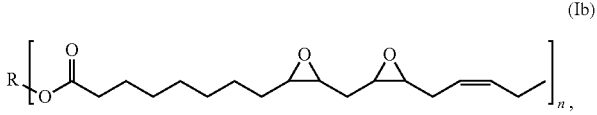

-continued

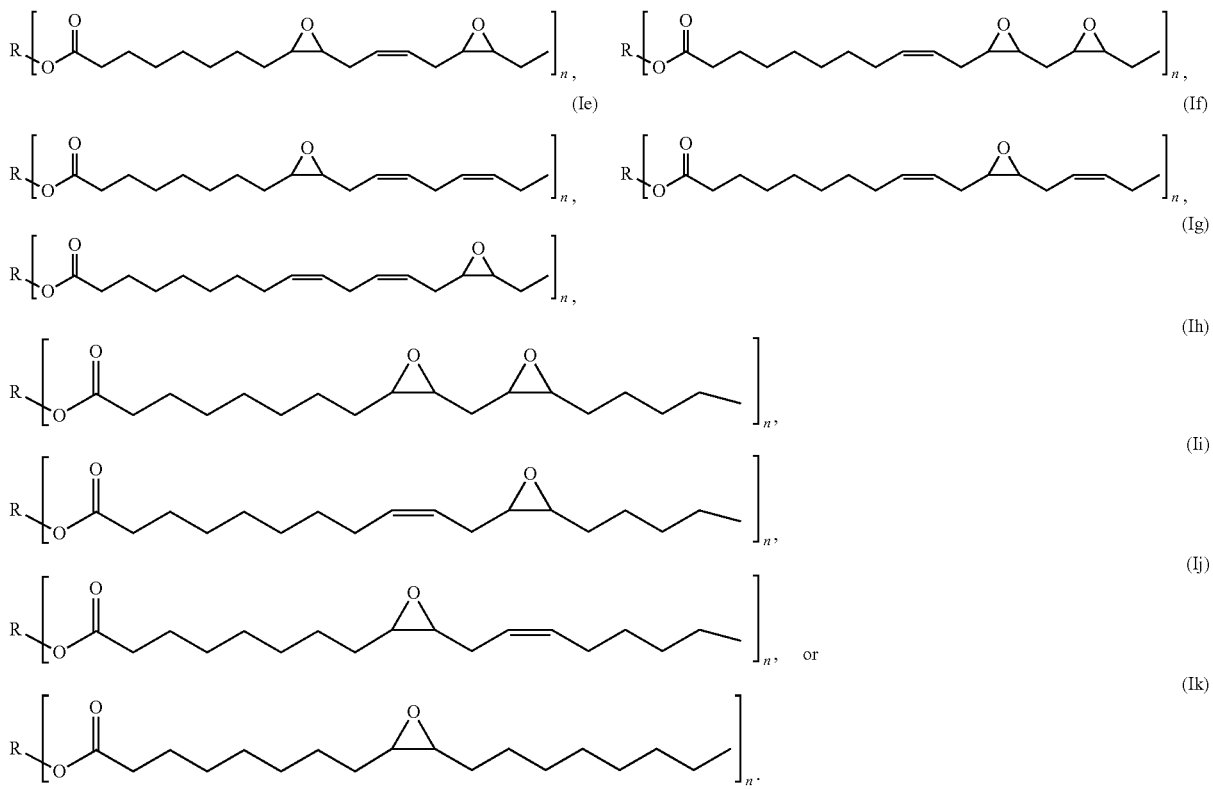

In one embodiment, the one or more rejuvenators of formula (I) or formula (X) is an epoxidized vegetable oil, the epoxidized fatty acid, and/or the epoxidized fatty ester may be, in some embodiments, a mixture of a vegetable oil, a fatty acid, and/or a fatty ester. The mixture may include any combination of vegetable oil, a fatty acid, and/or a fatty ester and any combination of an epoxidized vegetable oil, the epoxidized fatty acid, and/or the epoxidized fatty ester. The mixture may further include any combination of a non-epoxidized vegetable oil, non-epoxidized fatty acid, non-epoxidized fatty ester, or a mixture thereof. In one embodiment, the mixture further comprises one or more of rejuvenators of Formulae (IIa)-(IIc):

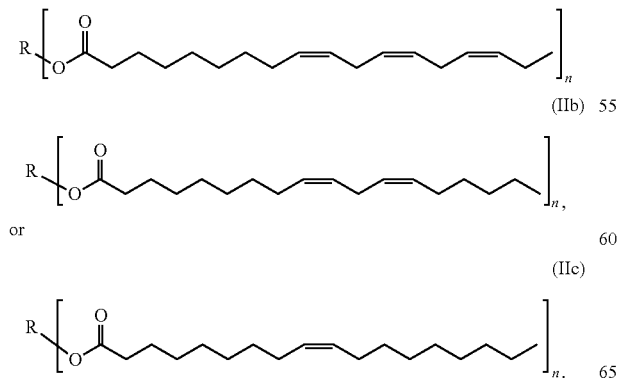

The oxirane oxygen content (also referred to herein as % oxirane oxygen or wt % of oxirane) of the one or more rejuvenators of formula (I) or formula (X) may be determined by using Official Method, Standard Cd 9-57 of the American Oil Chemists' Society ("Oxirane Oxygen in Epoxidized Materials" Official Method Cd 9-57 by the American Oil Chemist' Society (Reapproved 2017), which is hereby incorporated by reference in its entirety.

$$\text{Oxirane oxygen, } \% = \frac{\text{mL HBr to titrate test portion} \times M \times 1.60}{\text{mass of test portion, g}} \quad \text{Equation 1}$$

Where $M$ = Molarity of HBr solution

For example, the oxirane oxygen content for the one or more rejuvenators of formula (I) or formula (X) may be about 7.2%. In an embodiment, the oxirane oxygen content for the one or more rejuvenators of formula (I) or formula (X) may be about 4.5%. The functionality is the number of epoxide groups per molecule. The functionality of the one or more rejuvenators of formula (I) or formula (X) in accordance with the present application may be about 4.5 or may be about 2.1. In one embodiment, the one or more rejuvenators of formula (I) or formula (X) in accordance with the present invention may contain between 0.1 wt % and 10 wt % of oxirane. For example, the wt % of oxirane may be about 0.5, about 1, about 2, about 3, about 4, about 5, about 6, about 7, about 8, about 9, or about 10 wt %. In one embodiment, the one or more rejuvenators of formula (I) or formula (X) contains about 0.1-6.5 wt % of oxirane. In another embodiment, the one or more rejuvenators of formula (I) or formula (X) contains about 2.5-4.5 wt % of oxirane.

Common vegetable oils all possess some degree of unsaturation in the form of allylic double bonds, which can be quantified as $$N_{d,0} = \frac{\text{moles double bonds}}{\text{moles triglyceride}}$$

for an unmodified oil or $N_d$ for a chemically modified oil. As the oils are epoxidized, the degree of epoxidation $$N_e = \frac{\text{moles oxirane}}{\text{moles triglyceride}}$$

increases while $N_d$ decreases such that $N_d+N_e=N_{d,0}$. Presently, commercially available epoxidized vegetable oils (EVOs) EVOs are prepared for maximal $N_e$ values, such that $N_e \approx N_{d,0}$ and $N_d \ll 1$. For example, epoxidized soybean oils (ESO) such as Arkema Vikoflex® 7170 feature minimum oxirane values of 7%, corresponding to $N_e \approx 4.2$ and $N_d \approx 0.3$. The chemical reactivity, polarity, and viscosity of EVOs is well known to increase monotonically with the value of $N_e$, which can be measured via titration, through photospectroscopic techniques, or NMR.

EVO secondary oxiranes are desirable for their propensity to undergo coupling reactions with the acid groups of oxidized moieties in aged bituminous pavements and shingles. The adducts formed stabilize the aged species and prevent their agglomeration which is responsible for much of the embrittlement suffered by weatherized paving and roofing installations. In principle, the degree of reactivity with the asphalt increases with $N_e$ value. This consideration suggests that maximal $N_e$ values, as commercially prepared EVOs offer, are desirable.

However, the viscosity and polarity of EVOs in maintenance and preservation products also impact performance. If the viscosity becomes too high, it becomes impractical to bring the EVO in contact with as asphalt surface or shingle. Moreover, the speed with which EVO droplets can penetrate an asphalt surface decreases dramatically with increasing viscosity. For this reason, fully epoxidized ESO is unsuitable for the present invention. The polarity of the EVO strongly influences the miscibility with resinous binders. Non-epoxidized oils are the least polar and thus most miscible with non-oxidized asphalts. As the asphalt ages, it becomes slightly polar, and thus EVOs with intermediate $N_e$ values become most preferential from a solubility perspective. If $N_e$ is too large, however, the solubility once again decreases. For example, commercially available ESO is only partially miscible was asphalt Therefore, surprisingly, there exist optimal ranges of $N_e$ values that balance these various considerations for the performance of the claimed inventions. The precise optimal value will vary depending on the specific vegetable oil used, the environmental conditions of the application, the condition of the pavement or roofing system, and the method of application. Here, an $N_e$ value greater than about 1.0 and an $N_d$ value less than about $N_{d,0}-1$ may be used. In another embodiment, the $N_e$ value may be greater than about 1.2 and an $N_d$ value less than about $N_{d,0}-1.2$.

In one embodiment, the one or more rejuvenators of formula (I) or formula (X) is selected from the group consisting of:

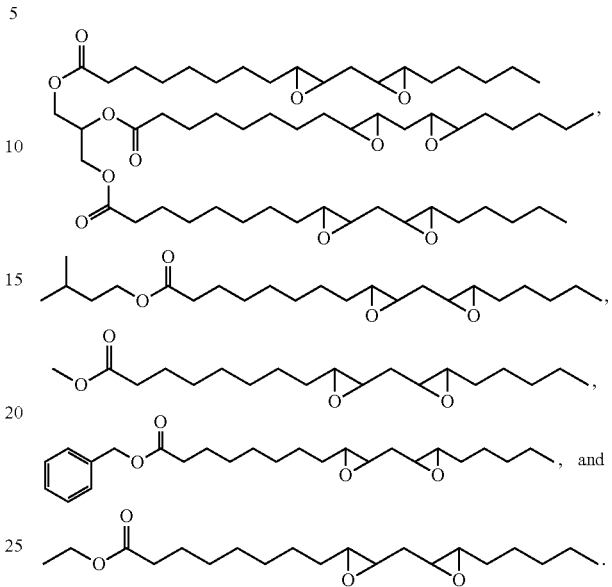

The epoxidized vegetable oil, an epoxidized fatty acid or epoxidized fatty ester may be in present in any suitable amount in the composition. The epoxidized vegetable oil, epoxidized fatty acid, and/or epoxidized fatty ester may be present anywhere between 1% to 99% of the composition. For example, the epoxidized vegetable oil, epoxidized fatty acid, and/or epoxidized fatty ester may be less than about 5 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, or about 99 wt %. The range of the wt % of the epoxidized vegetable oil, epoxidized fatty acid, and/or epoxidized fatty ester may be present in the composition between 10 to 90 wt %. In one embodiment, the epoxidized vegetable oil, epoxidized fatty acid, and/or epoxidized fatty ester is present in the composition in an amount of from 25 to 75 wt %. In another embodiment, the epoxidized vegetable oil, epoxidized fatty acid, and/or epoxidized fatty ester is present in the composition in an amount of from 30 to 55 wt %.

In some embodiments, the one or more rejuvenators of formula (I) or formula (X) of any embodiments described herein is selected from the group consisting of sub-epoxidized soybean oil (SESO), acrylated epoxidized soybean oil (AESO), epoxidized methyl soyate (EMS), and a combination thereof.

In some embodiments, the one or more rejuvenators of formula (I) or formula (X) of any embodiments described herein is sub-epoxidized soybean oil (SESO).

In some embodiments, the one or more surfactants of any embodiments described herein is selected from the group consisting of cationic emulsifying agents, anionic emulsifying agents, nonionic emulsifying agents, lecithin, and a combination thereof.

In some embodiments, the cationic emulsifying agents of any embodiments described herein are selected from the group consisting of fatty diamines, polyamines, modified tallow amines, N-(3-dimethylaminopropyl) lauroyl amide, N-(3-dimethylaminopropyl) myristoyl amide, N-(3-dimethylaminopropyl) Pal Michiruamido, N-(3-dimethylaminopropyl) stearoyl amide, N-(3-dimethylaminopropyl) oleoyl amide. N-(3-dimethylaminopropyl) linoleic Amide, N-(3-dimethylaminopropyl) linoleinamide, N-(3-diethylaminopropyl) lauroylamide, N-(3-diethylaminopropyl) myristoylamide, N-(3-diethylaminopropyl) palmitoylamide, N-3-diethylaminopropyl) stearoylamide, N-(3-diethylaminopropyl) oleoylamide. N-(3-diethylaminopropyl) linoleamide, N-(3-diethylaminopropyl) linoleinamide, N-(3-dibutylaminopropyl) lauroylamide, N-(3-dibutylaminopropyl) myristoylamide, N-(3-dibutylaminopropyl) palmitoylamide, N-(3-dibutylaminopropyl) stearoyl amide, N-(3-dibutyl aminopropyl) oleoyl amide N-(3-dibutyl aminopropyl) linoleic amide, N-(3-dibutyl aminopropyl) Reno Lane amide, REDICOTE® E-7000, REDICOTE® E-9, REDICOTE® E-70, and a combination thereof.

In some embodiments, the anionic emulsifying agents of any embodiments described herein are selected from the group consisting of petroleum sulfonates and sulfates, soap-type emulsifying agents, alkyl metal salts of higher fatty acids, fatty acid soaps (including lauric, myristic, palmitic, oleic, ricinoleic, linoleic acids and the like, mixtures of acids available from animal or vegetable oils), REDICOTE® E-7600, REDICOTE® E-7000, and a combination thereof. Other examples of anionic emulsifiers compatible with the present application are described in U.S. Pat. No. 4,282,087, which is hereby incorporated by reference in its entirety.

In some embodiments, the non-ionic emulsifying agents of any embodiments described herein are selected from the group consisting of ethoxylated alcohols, alkyl phenol ethoxylates, REDICOTE® EM33, ASFIER® N-400LN, TERGITOL NP-40, TERGITOL NP-70, and a combination thereof.

In some embodiments, the one or more stabilizing or gelling agents of any embodiments described herein is selected from the group consisting of: gums, acacia gum, cellulose gum, guar gum, locust bean gum, xanthan gum, agar, alginic acid, sodium alginate, potassium alginate, ammonium alginate, calcium alginate, polysaccharides from brown algae, casein, collagen, albumin, pectin, gelatin, polyvinyl alcohol, polyurethanes, acrylic polymers, latex, styrene/butadiene polymer, carboxymethyl cellulose, Hypromellose, gluten, hydroxyethyl methyl cellulose, attapulgite, bentonite, sodium salts, calcium salts, carrageenan, pullulan, konjac, alginate, modified castor oil, silicone resins, dimethicones, modified silicones, and a combination thereof.

In some embodiments, the one or more polymers of any embodiments described herein is selected from the group consisting of styrene butadiene copolymers, Elvaloy® 741 Copolymer, Elvaloy® AC1125 Acrylate Copolymer, Elvaloy® AC 12024S Acrylate Copolymer, Elvaloy® AC 1218 Acrylate Copolymer, Elvaloy® AC 1224 Acrylate Copolymer, Elvaloy® AC 1330 Acrylate Copolymer, Elvaloy® AC 1609 Acrylate Copolymer, Elvaloy® AC 1820 Acrylate Copolymer, Elvaloy® AC 2116 Acrylate Copolymer, Elvaloy® AC 2615 Acrylate Copolymer, Elvaloy® AC 2618 Acrylate Copolymer, Elvaloy® AC 3427 Acrylate Copolymer, Elvaloy® 4170 Copolymer, Elvaloy® 4924 Copolymer, Elvaloy® 5160 Copolymer, Elvaloy® 5170 Copolymer, Elvaloy® 742 Copolymer, Elvaloy® HP4051 Copolymer, Elvaloy® HP441 Copolymer, Elvaloy® HP661 Copolymer, Elvaloy® PTW Copolymer, Elvaloy® AC 34035 Copolymer, Elvaloy® HP662 Copolymer, Elvaloy® AC 2103 Acrylate Copolymer, polyethylene, cross-linked polyethylene, polypropylene, polybutadiene, polyisoprene, polyethylene terephthalate, polyvinyl alcohol, butyl acrylate, ethyl acrylate, methyl acrylate, polyacetic acid copolymers, homopolymers or copolymers of poly(acrylated epoxidized triglycerides), and a combination thereof.

In some embodiments, the one or more aggregates of any embodiments described herein is selected from the group consisting of natural aggregates from rock, manufactured rock, processing gravels, crushed stones, sand, gravel blends, crushed stone materials, fiberglass, and a combination thereof.

In some embodiments, the one or more colorants of any embodiments described herein is selected from the group consisting of iron oxide, titanium dioxide, azo pigments, phthalocyanine pigments, anthraquinone pigments, lead chromate, lead molybdate, cadmium red, Prussian blue, ultramarine, cobalt blue, chrome green, zinc oxide, and a combination thereof.

In some embodiments, the one or more antimicrobials of any embodiments described herein is selected from the group consisting of poly [oxyethylene (dimethyliminio) ethylene (dimethyliminio) ethylene dichloride], chitin, chitosan, citric acid, $C_{12-18}$-benzalkonium chloride, isopropyl alcohol, potassium tetraborate, elemental copper, elemental silver, colloidal silver, elemental zinc, and a combination thereof.

The present application provides an emulsified asphalt product comprising:
water;
one or more surfactants;
one or more binders; and
one or more rejuvenators of formula (I) of any of the embodiments described herein; and
wherein the components form an emulsion.

The present application provides an emulsified asphalt product comprising:
water;
one or more surfactants;
one or more binders; and
one or more rejuvenators of formula (X) of any of the embodiments described herein; and
wherein the components form an emulsion.

In some embodiments, the one or more binders is selected from the group consisting of bitumen, bio-asphalt, plant oil binders, animal fat binders, maltenes, and a combination thereof.

In some embodiments, the one or more rejuvenators of formula (I) or formula (X) of the emulsified asphalt product further comprises an $N_e$ value greater than about 1.0 and an $N_d$ value less than about $N_{d,0}-1$. In another embodiment, the one or more rejuvenators of formula (I) or formula (X) have an $N_e$ value is greater than about 1.2 and an $N_d$ value less than about $N_{d,0}-1.2$.

In some embodiments, the emulsified asphalt product further comprises reclaimed asphalt product.

In some embodiments, the emulsified asphalt product further comprises one or more polymers.

In some embodiments, the emulsified asphalt product further comprises one or more aggregates.

In some embodiments, the emulsified asphalt product further comprises one or more stabilizing or gelling agents.

In some embodiments, the emulsified asphalt product further comprises one or more colorants.

In some embodiments, the emulsified asphalt product further comprises one or more antimicrobials.

The present application also provides an emulsified coating product comprising:
  water;
  one or more surfactants; and
  one or more rejuvenators of formula (I) of any of the embodiments described herein;
  wherein the one or more rejuvenators have an $N_e$ value greater than about 1.0 and an $N_d$ value less than about $N_{d,0}-1$; and
  wherein the components form an emulsion.

The present application also provides an emulsified coating product comprising:
  water;
  one or more surfactants; and
  one or more rejuvenators of formula (X) of any of the embodiments described herein;
  wherein the one or more rejuvenators have an $N_e$ value greater than about 1.0 and an $N_d$ value less than about $N_{d,0}-1$; and
  wherein the components form an emulsion.

In some embodiments, the one or more rejuvenators of formula (I) or formula (X) of the emulsified coating product has an $N_e$ value greater than about 1.2 and an $N_d$ value less than about $N_{d,0}-1.2$.

In some embodiments, the emulsified asphalt product further comprises one or more binders.

In some embodiments, the one or more binders of the emulsified coating product is selected from the group bitumen, bio-asphalt, reclaimed asphalt shingles (RAS), plant oil binders, animal fat binders, maltenes, and a combination thereof.

In some embodiments, the emulsified coating product further comprises one or more polymers.

In some embodiments, the emulsified coating product further comprises one or more colorants.

In some embodiments, the emulsified coating product further comprises one or more antimicrobials.

In some embodiments, the emulsified coating product further comprises one or more aggregates.

In some embodiments, the emulsified coating product further comprises one or more crosslinkers.

In some embodiments, the one or more crosslinkers of the emulsified coating product is selected from the group consisting of elemental sulfur, ethanedithiol, propanedithiol, butanedithiol, pentanedithiol, hexane dithiol, Allyl mercaptan, dimercaptosuccinic acid, 2-mercaptoethanol, cysteine, pentaerythritol tetrakis(3-mercaptopropionate), 2,2'-(ethylenedioxy)diethanethiol, trimethylolpropane tris(3-mercaptopropionate), trithiocyanuric acid, trithiols, polyphsophoric acid, ethylene diamine, propylene diamine, butylene diamine, Tris(2-aminoethyl)amine, Cyclen, 1,4,7-triazacyclononane, 1,1,1-tris(aminomethyl)ethane, polyethylenimine, diethylenetriamine, triethylenetetramine, 1,4-phenylene-diamine, N,N,N',N'-tetrakis(3-aminopropyl)-1,4-butanediamine, and a combination thereof.

In some embodiments, the emulsified coating product further comprises one or more antistripping agents.

In some embodiments, the one or more antistripping agents of the emulsified coating product is selected from the group consisting of organosilane compounds, polyamine agents, amidoamine compounds, lime based antistripping agents, and a combination thereof.

Figure 31:
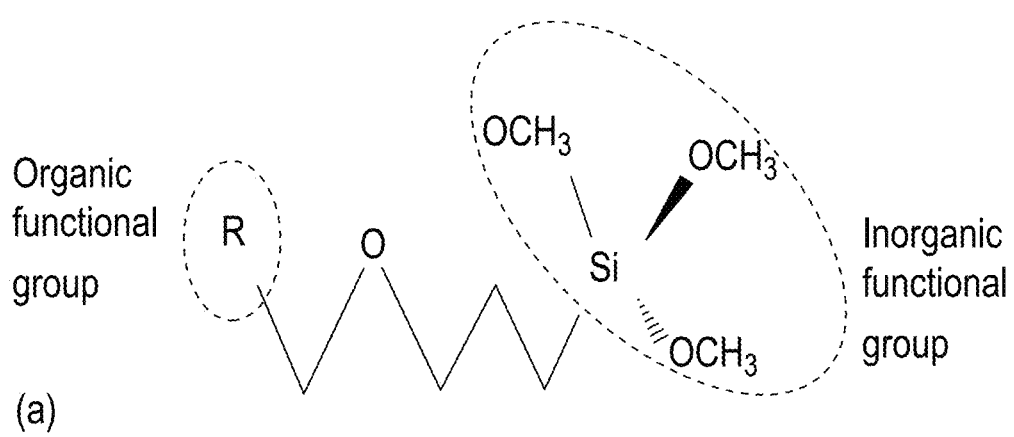
FIG. 31 shows the structure of organosilanes.

In some embodiments, the organosilane compounds of the emulsified coating product are selected from the group consisting of Zycosoil®, organosilanes of the structure shown in FIG. 31 and a combination thereof.

In some embodiments, the polyamine agents of the emulsified coating product are selected from the group consisting of tetraethylpentamine, bishexamethylenetriame, and a combination thereof.

In some embodiments, the amidoamine compounds of the emulsified coating product are selected from the group consisting of hydrogenated tallowamine, hydrogenated tallow alkyl amines, N-tallow propyldiamine, N-tallow alkyltrimethylenediamine, and a combination thereof.

In some embodiments, the lime based antistripping agents of the emulsified coating product are selected from the group consisting of hydrated lime ($Ca(OH)_2$).

In some embodiments, the emulsified coating product further comprises one or more wetting agents.

In some embodiments, the one or more wetting agents of the emulsified coating product is selected from the group consisting of Gemini surfactants, C2-C18 alkyl/alkylene/alkylyne straight or branched chain polyols, Surfynol® 61, Surfynol® 104, Surfynol® 2502, Surfynol® 420, Surfynol® 440, Surfynol® 465, Surfynol® 485, Surfynol® AD01, Surfynol® AS 5000, Surfynol® AS 5020, Surfynol® AS 5040, Surfynol® AS 5060, Surfynol® AS 5080, ethoxylates, ethoxysulfates, sulfates, sulfonates, carboxylates, polyoxyethylene surfactants, polyoxyethylene tallow amine, sodium lauryl sulfate, and a combination thereof.

Methods of Use

The present application also provides a method of treating a bituminous pavement surface comprising:
  providing a pavement, having a surface and a depth extending below the surface to the pavement bottom, with the emulsified asphalt product of any embodiments described herein.

The treatment can be sprayed on the bituminous pavement surface at a predetermined rate depending on weather conditions and desired results.

In some embodiments, of the method of treating a bituminous pavement surface, the pavement has a concentration of the emulsified asphalt product which is higher at the bituminous pavement surface than at a depth below about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100% of the pavement depth. In another embodiment, the concentration of the emulsified asphalt product is higher at the bituminous pavement surface than at a depth below about 50% of the pavement depth.

In some embodiments, of the method of treating a bituminous pavement surface, the pavement has a concentration of the one or more rejuvenators of the emulsified asphalt product which is higher at the bituminous pavement surface than at a depth below about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100% of the pavement depth. In another embodiment, the concentration of the one or more rejuvenators of the emulsified asphalt product is higher at the bituminous pavement surface than at a depth below about 50% of the pavement depth.

In some embodiments, of the method of treating a bituminous pavement surface, the pavement has a concentration of the one or more polymers of the emulsified asphalt product which is higher at the bituminous pavement surface than at a depth below about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100% of the pavement depth. In another embodiment, the concentration of the one or more polymers of the emulsified asphalt product is higher at the bituminous pavement surface than at a depth below about 50% of the pavement depth.

In some embodiments, of the method of treating a bituminous pavement surface, the pavement has a concentration of the one or more colorants of the emulsified asphalt product which is higher at the bituminous pavement surface than at a depth below about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100% of the pavement depth. In another embodiment, the concentration of the one or more colorants of the emulsified asphalt product is higher at the bituminous pavement surface than at a depth below about 50% of the pavement depth.

In some embodiments, of the method of treating a bituminous pavement surface, the pavement has a concentration of any one of the components described herein of the emulsified asphalt product which is higher at the bituminous pavement surface than at a depth below about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100% of the pavement depth. In another embodiment, the concentration of any one of the components described herein of the emulsified asphalt product is higher at the bituminous pavement surface than at a depth below about 50% of the pavement depth.

In some embodiments, of the method of treating a bituminous pavement surface, the aggregate is adhered to the surface of the pavement.

In some embodiments, of the method of treating a bituminous pavement surface, the method of treating is selected from the group consisting of fog sealing, chip sealing, tack coating, prime coating, slurry sealing, microsurfacing, and a combination thereof.

A fog seal is an application of a specially formulated asphalt emulsion (a thin liquid oil) to an existing bituminous pavement surface.

A chip seal is a bituminous pavement surface treatment that combines one or more layer(s) of asphalt with one or more layer(s) of fine aggregate.

A tack coat is a thin bituminous liquid asphalt, emulsion or cutback layer applied between HMA pavement lifts to promote bonding.

A prime coat is an application of a low viscosity asphalt to a granular base in preparation for an initial layer (or surface course layer) of asphalt.

A slurry seal is an application of a mixture of water, asphalt emulsion, aggregate (very small crushed rock), and additives to an existing bituminous pavement surface.

Microsurfacing is similar to slurry seal the difference is in how they harden. Microsurfacing uses chemical additives to harden rather than relying on evaporation.

Fog seals are used to rejuvenate a bituminous pavement surface by softening the old asphalt while chip seals, microsurfacing and slurry seals provide a new improved ride surface while addressing surface level defects like cracking and minor rutting. Tack coats are used when an improved bond is desired between two pavement layers.

The present application also provides a method of treating an asphalt roofing system comprising:
  contacting the asphalt roofing system with the emulsified coating product of any embodiments described herein.

The treatment of the roofing system can be carried out via spraying or painting the emulsion at a controlled application rate onto the shingle surface.

In some embodiments, of the method of treating an asphalt roofing system, the asphalt roofing system is selected from the group consisting of asphalt shingles, bitumen shingles, asphalt sealants, bitumen sealants, asphalt roll roofing, bitumen roll roofing, felt underlayments impregnated or coated with asphalt or bitumen, fiberglass mat underlayments impregnated or coated with asphalt or bitumen, polyester mat underlayments impregnated or coated with asphalt or bitumen, felt underlayments stabilized with asphalt or bitumen coating, fiberglass mat underlayments stabilized with asphalt or bitumen coating, polyester mat underlayments stabilized with asphalt or bitumen coating, felt underlayments with polymer modified asphalt or bitumen, fiberglass mat underlayments with polymer modified asphalt or bitumen, polyester mat underlayments with polymer modified asphalt or bitumen, and a combination thereof.

Treated Surface

The present application also provides a treated bituminous pavement comprising:
  an bituminous pavement having a surface and depth extending to a pavement bottom;
  a treatment coating on the surface of the bituminous pavement comprising:
  one or more binders; and
  one or more rejuvenators of formula (I) of any of the embodiments described herein; and
  wherein the components form an emulsion.

The present application also provides a treated bituminous pavement comprising:
  an bituminous pavement having a surface and depth extending to a pavement bottom;
  a treatment coating on the surface of the bituminous pavement comprising:
  one or more binders; and
  one or more rejuvenators of formula (X) of any of the embodiments described herein; and
  wherein the components form an emulsion.

The treated bituminous pavement can be produced by treatment of an bituminous pavement via spraying at a predetermined rate depending on weather conditions and desired results.

In some embodiments, of the treated bituminous pavement surface, the concentration of the one or more rejuvenators of the treated bituminous pavement surface is higher at the bituminous pavement surface than at a depth below about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100% of the pavement depth. In another embodiment, the concentration of the one or more rejuvenators of the treated bituminous pavement surface is higher at the bituminous pavement surface than at a depth below about 50% of the pavement depth.

In some embodiments, the treated bituminous pavement surface has a performance grade that varies with depth.

In some embodiments, the treated bituminous pavement surface has a high temperature performance grade at a depth below about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100% that is the same as the high temperature performance grade of the bituminous pavement without said treatment coating. In another embodiment, the treated bituminous pavement has a high temperature performance grade at a depth below about 50% that is the same as the high temperature performance grade of the bituminous pavement without said treatment coating.

In some embodiments, of the treated bituminous pavement surface, the low temperature performance grade at a depth below about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100% that is the same as the low temperature performance grade of the bituminous pavement without said treatment coating. In another embodiment, the treated bituminous pavement has a low temperature performance grade of the treated bituminous pavement at a depth below about 50% that is the same as the low temperature performance grade of the bituminous pavement without said treatment coating.

In some embodiments, the one or more rejuvenators of formula (I) or formula (X) of the treated bituminous pavement surface further comprises an $N_e$ value greater than about 1.0 and an $N_d$ value less than about $N_{d,0}-1$. In another embodiment, the one or more rejuvenators of formula (I) or formula (X) have an $N_e$ value is greater than about 1.2 and an $N_d$ value less than about $N_{d,0}-0.2$.

Examples

Materials

Maintenance treatments were prepared with various compositions of water, epoxidized methyl soyate (EMS), sub-epoxidized soybean oil (SESO), acrylated epoxidized soybean oil (AESO), poly(acrylated epoxidized high oleic soybean oil) (PAEHOSO), SBS polymers, colorants, dyes, asphalt, aggregates, and emulsifiers. EMS is a fatty acid consisting of an ester functional group followed by a hydrocarbon chain with 1 to 3 epoxide groups and 0 to 2 double bonds (C=C). SESO is a partially epoxidized soybean oil with anywhere between 0.1 and 3 epoxide groups and 1.4 to 4.6 double bonds (C=C). BioMAG is a blend of SESO and poly(acrylated epoxidized high-oleic soybean oil) (PAEHOSO) or poly(acrylated epoxidized soybean oil) (PAESO). PAEHOSO/PAESO is a polymer created from acrylated epoxidized high-oleic soybean oil or acrylated epoxidized soybean oil using reversible addition fragmentation chain transfer (RAFT) polymerization. High-oleic soybean oil is composed of triglyceride molecules with a lower number of double bonds on average. The acrylation adds acrylic acid to the double bonds of the triglyceride and acts as polymerization points through the double bonds on the acrylic group.

Characterization Techniques

Dynamic Shear Rheometer (DSR) Testing

A thin disk of asphalt either 25 mm diameter and 1 mm thick or 8 mm diameter and 2 mm thick is placed between two parallel plates. One of the plates remains stationary while the other oscillates, causing shear forces. The shear forces are measured as torque and converted to the measured values of complex modulus (G*), phase angle (δ), and others. The complex modulus is the ratio of stress to strain, and the phase angle is the time difference between the loading on the specimen and the response by the specimen multiplied by the frequency. The phase angle is directly relates to the degree of viscous versus elastic behavior of the material within the viscoelastic spectrum. A phase angle value of 0° corresponds to a purely elastic response, whereas 90° indicates purely viscous behavior. In these studies, the DSR was used to determine the high temperature performance grade (PG) and the intermediate temperature performance grade related to the fatigue behavior. The high temperature is measured by testing the asphalt binder at temperatures in 6° C. increments using 25 mm samples according to AASHTO M 320-17 and interpolating to obtain the failure temperature at which the binder no longer meets the criteria of having $$\frac{G^*}{\sin\delta} > 1 \text{ kPa}$$

for unaged or $$\frac{G^*}{\sin\delta} > 2.2 \text{ kPa}$$

for rolling thin film oven (RTFO) aged binders. The intermediate temperature follows a similar procedure, except using 3° C. increments until the binder has G* sin δ>5000 kPa and is measured using 8 mm samples of PAV aged binder.

The RTFO is used to simulate the aging that occurs during the mixing and compaction processes in which the binder is at high temperature while being a thin film coating the aggregates while exposed to air. The RTFO has a rotating carriage that holds bottles containing a small amount of asphalt. As the carriage is rotated, the heated binder in the bottles forms a thin layer and has air blown across the thin film. This promotes the oxidation of the asphalt binder like what would occur during construction. The pressure aging vessel (PAV) is another aging device used to simulate the oxidation that occurs in a pavement over the course of 5 to 10 years. Asphalt is loaded onto plates and forms a thin film. These plates are loaded into the chamber and exposed to heat and pressure for 20 hours. The procedures for RTFO and PAV are in AASHTO T 240-13 and AASHTO R 28-12 respectively.

Bending Beam Rheometer (BBR) Testing

The bending beam rheometer is an instrument used for performing creep tests on small asphalt binder beams according to AASHTO 313-12. These beams are 6.35 mm by 12.7 mm by 127 mm and are made from the PAV aged binder. The beams are cooled in a liquid bath for one hour at the desired test temperature. The test temperature is set at 10° C. above the desired PG temperature. Then the beams undergo a creep test in which a constant 980 mN load is applied for 250 seconds while the deflection is measured. The stiffness curve is calculated from the deflection values and the slope of this stiffness curve is called the m-value. The stiffness and m-value at 60 seconds is compared to the standard requiring the binder to have a stiffness below 300 MPa and an m-value less than 0.3. The beams are tested at two or more temperatures and the failure temperature is interpolated for both stiffness and m-value and the higher temperature and more conservative value is reported as the low temperature PG. The ΔTc is the difference between the stiffness failure temperature and the m-value failure temperature. A positive ΔTc indicates a stiffness-controlled binder and a negative ΔTc indicates an m-value controlled binder. When a binder is m-value controlled, it means that the binder is unable to relieve the internal stresses quickly enough. This leads to a buildup of internal stresses until the asphalt binder eventually fractures.

The BBR device can also be used to measure a beam of asphalt mix either from a field core or lab produced sample with some modifications to the procedure according to AASHTO 125-16. A saw is used to cut the HMA into beams of 6.35 mm by 12.7 mm by at least 115 mm in length. The test load must be increased to 4000 mN for measurable deflections to be obtained. Samples from the field trial will be cut to size and tested using this procedure.

Beam Fatigue Testing

Fatigue damage occurs in asphalt after repeated loading like many other materials. Very small amounts of damage occur within the material with each load, and this damage accumulates leading to a reduction in stiffness. The beam fatigue test uses a four-point loading setup with an actuator that applies a load repeatedly at a specified strain level according to AASHTO T 321-17. The test measures the initial stiffness in MPa at 50 load cycles, then terminates once the stiffness reduces to 50% of this initial value. HMA specimens are typically created in a rolling slab compactor to the desired air voids, then saw cut into beams measuring 50 mm by 63 mm by 380 mm. The beams created in the cutback lab study were compacted, then treated with cutback, leaving three slabs as control. The beams were a reduced thickness of 38.5 mm to represent the top surface of an bituminous pavement. Aged and brittle bituminous pavements have a much lower fatigue life and accumulate damage rapidly due to the reduced ductility of the asphalt binder.

Disk-Shaped Compact Tension (DST) Testing

The low temperature behavior of an bituminous pavement is measured using the disk-shaped compact tension test according to ASTM D7313-13. In this test a 150 mm diameter, 50 mm thickness HMA sample is used, either lab produced or cored from the field. The samples then have a 62.5 mm long notch cut into them and two 25 mm diameter holes bored. The holes are used to load the sample into the machine that will slowly pull the specimen apart. The notch controls the location of the cracking, and the crack mouth opening displacement (CMOD) is used to control the rate at which the machine pulls the specimen apart. The test temperature is performed at 10° C. degrees above the low temperature PG of the asphalt binder. For both the lab and field study −12° C. was used as the test temperature. The load applied is plotted against the CMOD, and the area under this curve is used to calculate the fracture energy (Gf) in J/m$^2$.

Hamburg Wheel Tracking (HWT) Testing

To test the HMA for rutting, the Hamburg wheel tracking test was used according to AASHTO T 324-17. In this test, a steel wheel is loaded on the samples and rolled across the specimen repeatedly while submerged in a water bath. This allows for the stripping potential of the HMA to also be tested. The specimens are 150 mm diameter and the thickness must be at least twice the nominal maximum aggregate size. The wheel is loaded at 750N and passes across the specimens around 52 times per minute. The depth of the rutting is measured as the test progresses and a plot of rut depth in relation to cycles can be created. Two straight slopes will be observed. The first is a linear trend of the rutting occurring, then after some number of cycles the slope will increase drastically to another linear trend. This abrupt change in slope is the stripping inflection point and indicates the point at which moisture damage has occurred. The HWT in this study was performed by the Iowa DOT laboratory and was only performed for the field trial.

Dynamic Modulus Testing

The dynamic modulus is measured by applying a cyclic haversine loading to an HMA specimen and measuring the strain levels that occur in the specimen. The dynamic modulus, E* is equal to the maximum peak-to-peak stress divided by the maximum peak-to-peak strain. The phase angle is the time lag between the stress peak and the strain peak occurring. The dynamic modulus test is performed at several frequencies and test temperatures to obtain a wide range of test conditions. These separate curves can then be fit together utilizing the time temperature superposition (TTSP). The TTSP concept explains that the behavior of a viscoelastic material at high frequency is equal to the behavior of this material at some low temperature and vice versa. Using this concept, the curves can be shifted about a central temperature using one of the models that has been developed to create one smooth master curve. The dynamic modulus samples for the lab study and field study were tested at 0° C., 15° C., and 30° C. with a range of frequencies (25 Hz, 20 Hz, 10 Hz, 5 Hz, 2 Hz, 1 Hz, 0.5 Hz, 0.2 Hz, and 0.1 Hz). commonly used model to create a master curve was developed by Pellinen et al. (*J. Assoc. of Asphalt Pav.* 71, (2002), which is hereby incorporated by reference in its entirety) using the following sigmoidal function, $$\log|E^*| = \delta + \frac{\alpha}{1 + \exp\left(\beta + \gamma \log \frac{1}{f_r}\right)} \qquad \text{Equation 2}$$

where: |E*| is the absolute value of the dynamic modulus in MPa, α is the minimum dynamic modulus value in MPa, δ, β, and γ are fitting parameters, and fr is the reduced frequency. The reduced frequency is the frequency value after being shifted to a higher or lower frequency. The reduced frequency can be given by the following, $$f_r = \frac{f}{a(T)} \rightarrow \log f_r = \log f - \log a_T \qquad \text{Equation 3}$$

where: f is the measured frequency and a(T) is the shift factor. The shift factor for the central temperature is 1, so the log(a(T)) is equal to zero, meaning that reduced frequency equals measured frequency for this temperature. A more recent model was developed by Podolsky et al (*Int. J. Pavement Res. Technol.* 11, 541-552 (2018), which is hereby incorporated by reference in its entirety) that can determine the phase angle master curves by changing the square to an x power of the Booij, et al (BT) (*Rheol. Acta* 21, 15-24 (1982), which is hereby incorporated by reference in its entirety) and Yang and You (YY) (*J. Mater. Civ. Eng.*, 2015, 27(3): 0401413104014131 (2015), which is hereby incorporated by reference in its entirety) models to improve the fit of the curve to the data $$\delta(f_r) \approx c \frac{\pi}{2} \frac{\alpha \gamma}{(1 + e^{\beta - \gamma \log f_r})^x} e^{\beta - \gamma \log f_r} \qquad \text{Equation 4}$$

where: δ(fr) is the phase angle in radians and c and x are the additional fitting parameters. The Podolsky model was used in this study along with the Witczak model to create the dynamic modulus and phase angle master curves.

Permeability Testing

The permeability of a pavement is very important. When water is able to get into the pavement structure and freezes, the expansion causes significant damage. Another problem is when water penetrates into the road base and subgrade causing a softening of the pavement foundation. Often a new pavement has very low or no permeability, but over time through micro-cracking or thermal cracking the permeability increases. This increased permeability leads to more water infiltration further accelerating the problem. The permeability was tested on the field trial samples according to a Florida DOT Method FM 5-565. This test is a falling head permeameter starting with initially 500 mL of water above the sample. The time for the water to reach the lower timing mark is recorded or if the sample has low permeability, the height that the water reaches after 30 minutes is recorded. These measurements along with geometric measurements are used to calculate the coefficient of permeability utilizing the following, $$k = \frac{aL}{At} t_c \ln \frac{h_1}{h_2} \qquad \text{Equation 5}$$

where: k is the coefficient of permeability in cm/s, a is the inside cross-sectional area of the burette in $cm^2$, L is the average thickness of the test specimen in cm, A is the average cross-sectional area of the test specimen in $cm^2$, t is the elapsed time between the measurements in seconds, $h_1$ is the initial height of water above the sample in cm, $h_2$ is the final height of water above the sample in cm, and $t_c$ is a temperature correction coefficient if a temperature other than 20° C. is used. Petroleum jelly was used to ensure a good seal between the test sample and the device.

Penetration Testing

Penetration of the cutback during the lab study was measured in two ways. The first method was qualitative while the second was quantitative. The first method was using compacted HMA slabs, then applying the cutback to the slab and letting it sit for seven days. Two sets of slabs for each cutback treatment were created. One set was kept at 4° C. and the other at 40° C. to observe the effect of temperature on penetration. The slab was then cut into slices keeping the top ½" and the second ½", the material deeper than 1" was discarded. Then, the asphalt binder from the sections of the slabs were extracted using toluene and centrifuge and then recovered using distillation to remove the toluene. The asphalt binder from each section was characterized by DSR and BBR testing. The second method was to analyze the fractured specimens from the DCT testing. Because the samples were at −12° C., there was no possibility for flow of material or contamination on the surface. A ruler was placed against the samples' fractured surfaces and a direct measurement was taken. The bio-additive was able to be seen clearly as it made the asphalt much more reflective than the unaffected sections.

Friction Testing

The British Pendulum Test is a method that provides a measure of a frictional property, micro-texture of surfaces, either in the field or in the laboratory. This test method may be used to determine the relative effects of various polishing processes or the application of maintenance additives on materials or material combinations. The instrument used for this is test is the British pendulum tester, a dynamic pendulum impact-type tester that measures the energy loss when a rubber slider edge is propelled over a test surface.

Pavement Marking Reflectivity

Pavement markings are an accepted method to communicate both the intended travel path and roadway alignment for drivers during day and nighttime conditions. To ensure consistent application of pavement markings, their characteristics and warranting criteria can be found in the Manual on Uniform Traffic Control Devices (MUTCD). The new MUTCD Section 3A.03 requires agencies to use a method designed to maintain longitudinal pavement markings to a minimum level of retroreflectivity, see Table 1. The Federal Highway Administration (FHWA) believes that this change will promote safety while providing sufficient flexibility for agencies to choose a maintenance method that best matches their specific conditions.

TABLE 1

Minimum Maintained Retroreflectivity Levels for Longitudinal Pavement Markings.

| | Posted Speed (mph) | | |
| --- | --- | --- | --- |
| | ≤30 | 35-50 | ≥55 |
| Two-lane roads with centerline markings only | n/a | 100 | 250 |
| All other roads | n/a | 50 | 100 |

1. Measured at standard 30-m geometry in units of $mcd/m^2/lux$
2. Exceptions:
A. When RRPMs supplement or substitute for a longitudinal line (see Section 3B.13 and 3B.14), minimum pavement marking retroreflectivity levels are not applicable as long as the RRPMs are maintained so that at least 3 are visible from any position along that line during nighttime conditions.
B. When continuous roadway lighting assures that the markings are visible, minimum pavement marking retroreflectivity levels are not applicable.

Example 1—Cutbacks

Cutbacks were produced with PG 58-28 at 45° C. to which room temperature RRM oil (EMS, SESO, or BioMAG) was added; the temperature was then maintained at 45° C. The low processing temperature ensures the preservation of the oxirane functionality which is critical to the function of the RRM. An IKA mixer was used with the propeller blades just above the semi-solid asphalt surface, mixing at 250 rpm. After a short duration, the asphalt begins to soften as it is solvated. The blends were created at 80:20 bio-additive to asphalt binder. It is possible to blend at this low temperature with as low as 70-75% bio-additive if a soft asphalt binder is used. The result is a viscous black liquid at room temperature. The cutbacks created with SESO or EMS are low viscosity and could be applied by spraying, whereas the cutback with the polymer additive is very viscous and would have to be brushed or pushed across the pavement to apply.

Example 2—Fog Seals

Fog Seals: The fog seal were prepared by emulsifying a mixture of the RRM (SESO, AESO or BioMAG) and asphalt using a slow setting emulsifier or by emulsifying the RRM (SESO, AESO or BioMAG) alone using a slow setting emulsifier. RRM was added at 8% by weight to asphalt by blending it with a Silverson shear mixer. The asphalt was heated to 150° C. before adding the RRM and blended for one hour at 1500 rpm. 2.5 wt. % amine-based slow-setting emulsifier was added to water to create an emulsifier 'soap' solution. The pH of the solution was monitored using an Oakton 700 benchtop pH probe. A solution of 33% HCl was used to lower the pH of the solution from 11.0 to 2.0. A Denimotech laboratory emulsion mill was used to prepare the cationic slow setting emulsion. The asphalt-SESO blend was added to the asphalt tank maintained at 145° C. The emulsifier 'soap' solution was added to the water phase storage tank maintained at 40° C. These temperatures were predetermined to ensure a balance between the viscosity of the asphalt, critical in ensuring correct flow rates, and exit temperature of the emulsion, which is required to be under the boiling point of water. The emulsion mill was run at a speed of 9000 rpm to shear the asphalt-SESO blend as it was mixed with the water phase, ensuring a uniform and stable oil-in-water suspension. The flow rates of both the asphalt and water phase were maintained to produce an emulsion with a minimum residue content of 65%. The emulsion exiting the mill was collected in high density polyethylene bottles and allowed to cool before application. Color-bearing cutbacks and fog seals can be produced using a translucent asphalt binder in conjunction with a colorfast colorant, such as resinous forest product residues and iron oxide dyes.

Example 3—Modal Aged Pavement

Figure 2:
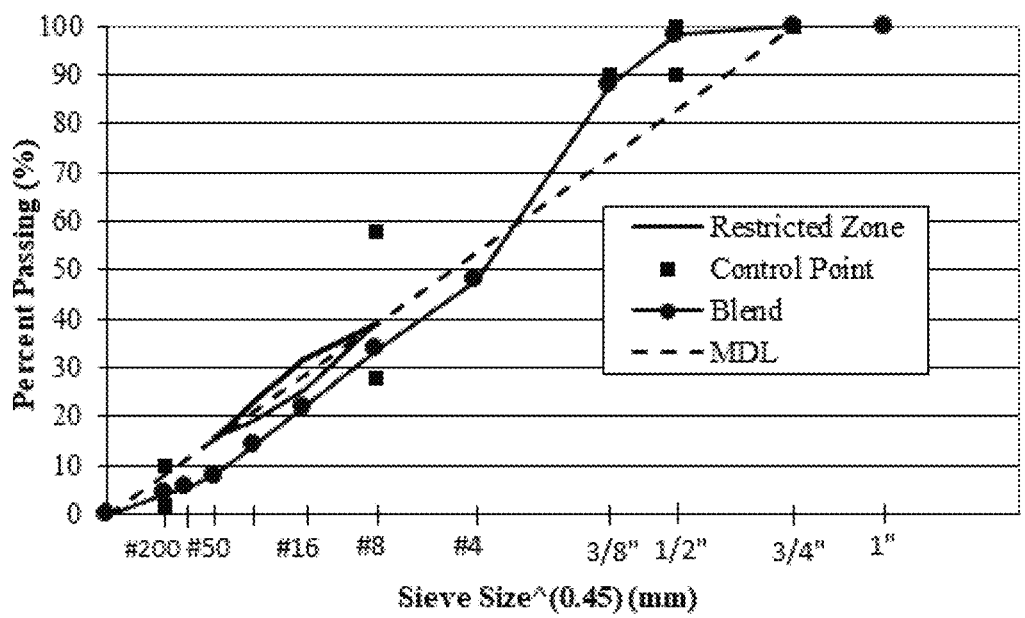
FIG. 2 shows the lab study aggregate gradation.

A simulated aged pavement was fabricated for lab studies by treating a hot mix asphalt design with a model aged asphalt binder. The pseudo-aged asphalt binder was created by blending a low-quality vacuum tower bottom (VTB) and a soft PG 52-34 binder at 1:1 ratio. A VTB is a by-product of the vacuum distillation technique used on crude oil to extract more of the lighter molecular weight components. VTBs are very stiff asphalts that are not typically used in paving. The resulting blend was a PG 70-16 (70.4-20.1) with $\Delta T_c=-0.4°$ C. This binder was mixed at 4.69 wt. % with a dense coarse-graded aggregate blend. The gradation is shown in FIG. 2, consisting of 57% limestone, 10% quartzite, 10% natural sand, 18% manufactured sand, and 5% aglime. The line labelled MDL in FIG. 2 represents the maximum density line. The control points and restricted zone are set according to AASHTO M 323-17. Once the mix was created it was aged in the oven for two hours at 160° C. to allow the asphalt binder to soak into the surface voids of the aggregates. Then the mix was compacted to 7% air voids at varying sizes for the mix tests that were performed using a Superpave gyratory compactor.

Example 4a—Field Study Pavement

Figure 3:
FIG. 3 shows the field study location at Iowa State University Lot 10.

The field study of the cutback and fog seal formulations was conducted at Iowa State University Parking Lot 10. Four parking stalls were selected that did not have any major cracking, as shown in FIG. 3. Two treatments were applied to each stall leaving a small gap between the treatments to ensure there was no mixing. The control section with no treatment was included in one of the half stall areas. One quarter of a parking stall area was covered with a treatment, using only the front half of the stall. Ten cores were removed from the control section at time zero to establish a baseline of the pavement conditions prior to treatment. After three months, ten cores will be taken from each treatment area to perform mix testing including the control section. Three of the ten cores are full depth 4" diameter cores for dynamic modulus testing, and seven of the cores are approximately 2" depth 6" diameter cores. These shallow cores are broken from the rest of the pavement structure at the horizontal joint between the base course and surface course of asphalt mix.

Figure 4:
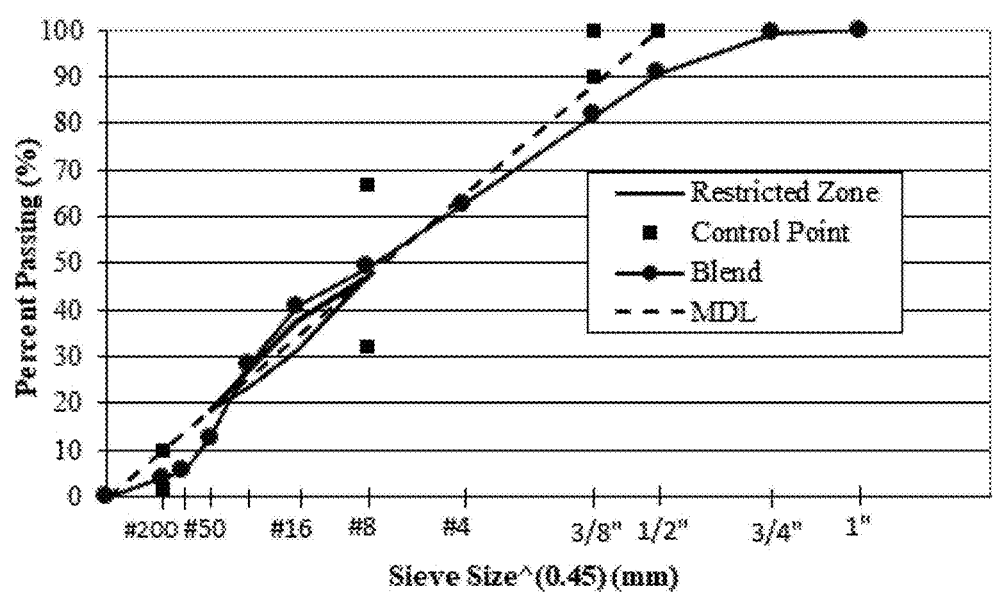
FIG. 4 shows the existing pavement aggregate gradation.

The existing bituminous pavement was constructed in the summer of 1995 in two layers, a base course of approximately 4" and a surface course of approximately 2". In 2015 the parking lot had the cracks sealed and a seal coat application done for maintenance. A seal coat is a process in which a thin layer of asphalt binder is applied over the top of the existing pavement to reduce water permeability and extend the life of the pavement very similar to a fog seal. By extracting the asphalt binder from the existing HMA pavement, the properties were able to be determined in the current condition. The asphalt content is approximately 5.4% with 8.0% air voids. The air voids were determined by first measuring the bulk specific gravity then heating the core to break it down into individual aggregates according to AASHTO T 269-14. The aggregate gradation was measured on the aggregates after asphalt extraction according to AASHTO T 27-14 and AASHTO T 11-05 shown in FIG. 4. The asphalt binder is a PG 70-10 (70.1-15.3) with $\Delta T_c=-13.3$, 7.8% elastic recovery and Jnr=0.6125 kPa-1. The intermediate fatigue temperature was determined to be 27.8° C. by DSR according to AASHTO M 320-17.

Figure 5:
FIG. 5 shows the image of the test section before the fog seals were applied.
Figure 6:
FIG. 6 shows the image of the test section after the fog seals were applied.
Figure 7:
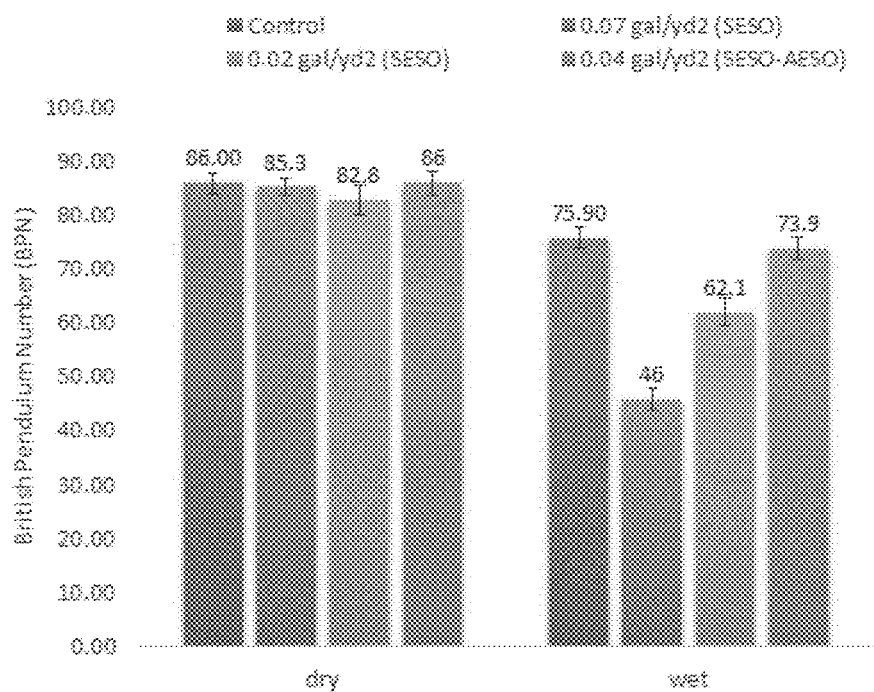
FIG. 7 shows the results of the British Pendulum Friction Tests of three different Fog seals.
Figure 8:
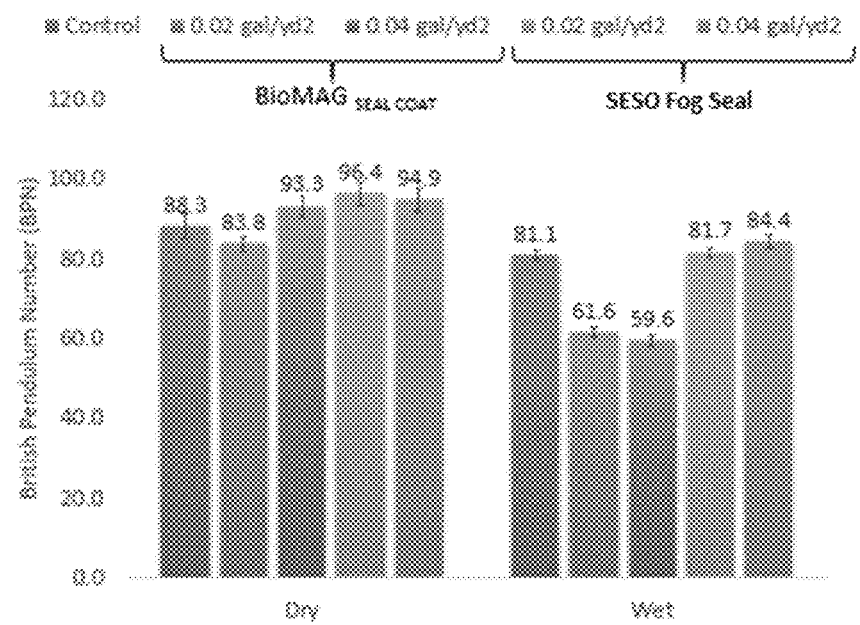
FIG. 8 shows the results of the British Pendulum Friction Tests of two different Fog seals.

A series of additional tests were conducted at Iowa State University's Football Stadium Parking Lot. A SESO, SESO-AESO, and BioMag based fog seals were tested at three different application rates (0.2, 0.4, 0.7 gat/yd$^2$), see FIGS. 5 and 6. Friction testing was done on the treated sections using the British Pendulum Test in wet and dry conditions, ambient temperature of 85° F. and 12 hours after application, see FIGS. 7 and 8.

Figure 9:
FIG. 9 shows the retroreflectivity of the pavement marking to almost that of the untreated value within 60 minutes of application.

After application, the retroreflectivity of the pavement was monitored with a handheld reflectometer. It was noted that the retroreflectivity was within 5% of the untreated value within 60 minutes of application, see FIG. 9.

Example 4b—Pavement Treatments

Pavement treatments were applied at a controlled dose rate with a paint roller. Lab study specimens were kept in an environmentally controlled room ranging from 15° C. to 20° C. for three weeks before mix testing was performed.

Example 5—Roofing Maintenance Treatments

Figure 10:
FIG. 10 shows the aqueous sub-epoxidized soybean oil (SESO) emulsion preparation, before adding the colorant.

Qualitative testing of roofing materials was done by taking aged asphalt shingles and applying a thin coating of the SESO/EMS/colorant emulsion (water in oil) onto the shingle with a paint brush. The material was allowed to soak in for a day and the change in flexibility between aged and RRM-treated asphalt shingle was observed qualitatively. The SESO/EMS emulsions were prepared by mixing SESO/EMS with soy lecithin (8% by weight of the oil) at room temperature using a standard IKA mixer and paddle blade or a Waring WSB50 immersion blender for 5 minutes. The SESO/EMS-Soy Lecithin mixture is then transferred to a container equipped with a Waring WSB50 immersion blender set at full speed as shown in FIG. 10. Water is then slowly added to the mixture until the desired concentration has been achieved. Once all water has been added, the colorant/dye is added, and it is allowed to mix for 15 minutes.

Example 6—Pavement Maintenance Treatment Results

Cutback and (CB) fog seal (FS) formulations have undergone testing on laboratory produced specimens (LS), and are currently undergoing a field study (FS) along with the fog seal materials. The materials used in both studies are shown in Table 2. Samples are encoded according to the scheme X-Y-Z where X delineates between lab-study (LS) and field study (LS); Y indicates cutback (CB) versus fog seal (FS); and Z represents formulation/processing characteristics. The lab study used a much higher dosage rate than field study as this was the first trial. It was decided that the dosage rate could be reduced significantly and still observe an increase in performance of the aged bituminous pavement. Tables 3 and 4 show the tests that were performed during the lab study and the field study respectively. A lower number of replicates for Hamburg wheel tracking test (HWT) was chosen as rutting is not predicted to occur with the fog seal treatment. Dynamic shear rheometer (DSR) testing was performed without replication, because the high temperature grade testing performed by the instrument takes ten measurements at a temperature above and below the failing point and interpolates. The penetration test had two tests performed with one replication each, more detail is provided in the permeability/penetration testing section.

TABLE 2

List of Materials and Treatments

| Code | Bio Additive | Application Rate (gal/sq. yd) | Description |
|---|---|---|---|
| LS-C | none | N/A | Lab Study, control |
| LS-CB-S | SESO | 0.174 | Lab Study, Cutback, SESO |
| LS-CB-E | EMS | 0.174 | Lab Study, Cutback, EMS |
| FS-C | none | N/A | Field Study, control |
| FS-CB-S | SESO | 0.034 | Field Study, Cutback, SESO |
| FS-CB-E | EMS | 0.033 | Field Study, Cutback, EMS |
| FS-CB-B | BioMAG | 0.102 | Field Study, Cutback, BioMAG |
| FS-FS-SA | SESO | 0.051 | Field Study, Fog Seal, SESO in Asphalt |
| FS-FS-SW | SESO | 0.052 | Field Study, Fog Seal, SESO in Water |
| FS-FS-BA | BioMAG | 0.048 | Field Study, Fog Seal, BioMAG in Asphalt |

TABLE 3

Lab Study Tests

| Material | DSR | BBR | Beam Fatigue | DCT | Dynamic Modulus | Penetration |
|---|---|---|---|---|---|---|
| LS-C | x | xxx | xxx | xxx | xxx | x |
| LS-CB-S | x | xxx | xxx | xxx | xxx | x |
| LS-CB-E | x | xxx | xxx | xxx | xxx | x |

*Each x represents a test replicate

TABLE 4

Field Study Tests

| Material | DSR | BBR* | DCT | HWT | Dynamic Modulus | Permeability | Friction |
|---|---|---|---|---|---|---|---|
| FS-C | x | xxx | xxx | xxxx | xxx | xxxx | xxx |
| FS-CB-S | x | xxx | xxx | xxxx | xxx | xxxx | xxx |
| FS-CB-E | x | xxx | xxx | xxxx | xxx | xxxx | xxx |
| FS-CB-B | x | xxx | xxx | xxxx | xxx | xxxx | xxx |
| FS-FS-SA | x | xxx | xxx | xx | xxx | xxxx | xxx |
| FS-FS-SW | x | xxx | xxx | xx | xxx | xxxx | xxx |
| FS-FS-BA | x | xxx | xxx | xx | xxx | xxxx | xxx |

Figure 11:
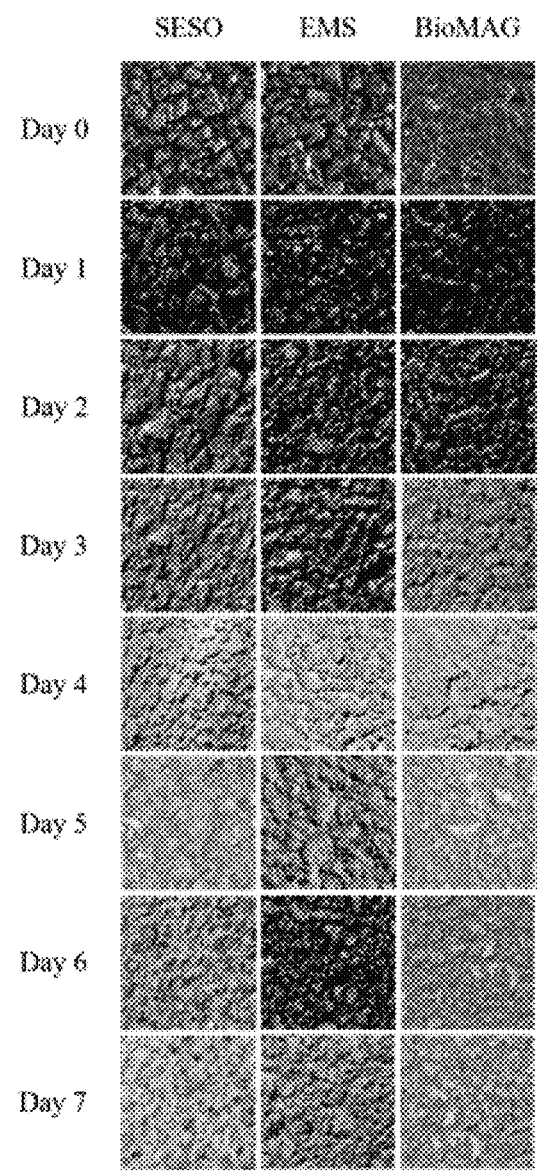
FIG. 11 shows pictures of cutback application.

*BBR test includes BBR for asphalt binder and asphalt mix
**Each x represents a test replicate Close-up pictures from the cutback application in the field study are shown in FIG. 11. Day 0 represents the treatment within one hour of application, then day 1 is 24 hours later and so on. Water had washed across the treatment areas on day one due to nearby construction. The weather was not ideal during the first week. The temperatures ranged from 18° C. to −4° C. with rain on day 4 and freezing rain on day 6. If the temperature is consistently at 25° C. or higher and without any rain or water, it is predicted that the SESO cutback would soak in by day two or three at the latest. The others would take a few days longer. The BioMAG cutback remained very slick until day 6, and the EMS cutback still slightly wet on day 7. The fog seal applications dried within a few hours and did not change in appearance after drying.

Beam Fatigue Lab Results

Figure 12:
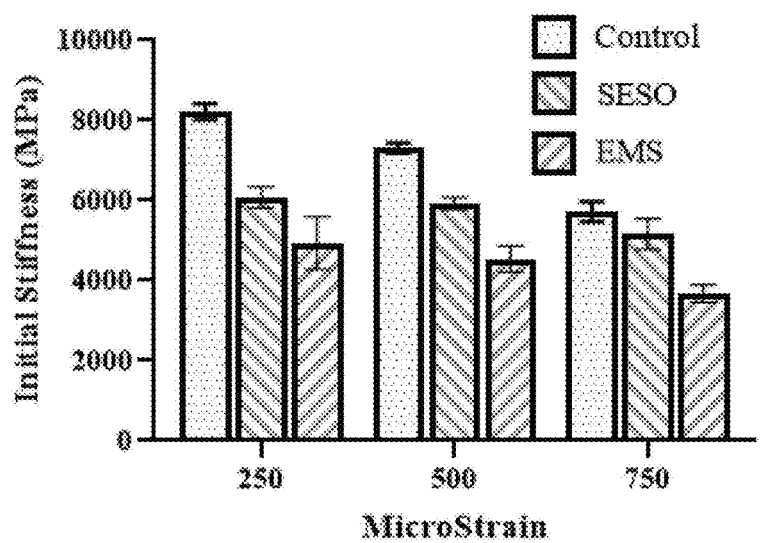
FIG. 12 shows beam fatigue initial stiffness data.
Figure 13:
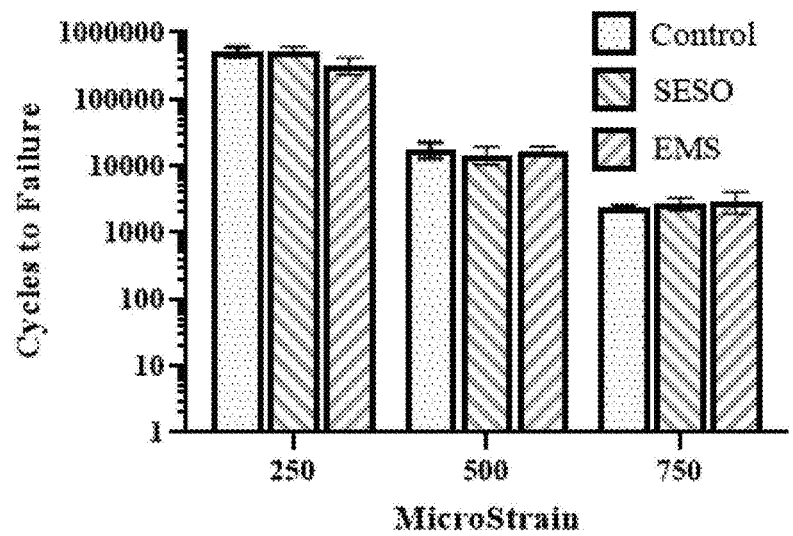
FIG. 13 shows beam fatigue cycles to failure data.
Figure 14:
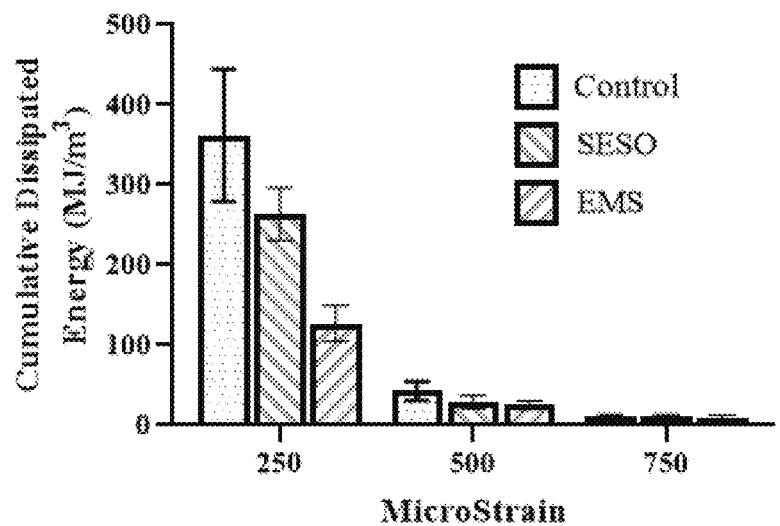
FIG. 14 shows beam fatigue cumulative dissipated energy data.

The beam fatigue testing was performed at three strain levels (250, 500, and 750 µstrain) for the lab study cutback-treated specimens LS-CB-C, LS-CB-S and LS-CB-E. Three beams were tested at each condition for a total of 27 beams tested. Three beams came from a compacted HMA slab. Some variability may have come from the different slabs, so the results were analyzed using a statistical blocking design. The initial stiffness, cycles to failure, and cumulative dissipated energy are the factors of interest, while the slab that each measurement came from is the blocking factor. Each factor of interest was analyzed separately, and Tukey's honest significant difference (HSD) analysis was performed at a significance level of 0.05. The data from the beam fatigue tests are presented in FIGS. 12-14. The error bars shown on the data represent the standard error of the mean from the statistical analysis.

Initial stiffness is not typically a reported value from beam fatigue tests; however, the large differences show the softening effect of the cutback treatments. Using the statistical analysis, the P-value for treatment was less than 0.0001 showing that the treatments had a significant effect on the initial stiffness. The slab blocking factor had a P-value of 0.0001 showing that the slab did in fact have some influence on the initial stiffness. Tukey's HSD showed that each treatment was significantly different from the others. The EMS cutback shows the largest reduction in initial stiffness. The effect is most prominent at low strain levels.

The cycles to failure did not show much difference from any treatment. The statistical analysis showed a P-value of 0.7572 for the treatments meaning that there was no significant effect of the cutbacks on the cycles to failure. Fatigue cracking typically starts and propagates from the bottom of an HMA pavement. This treatment is meant to only rejuvenate the top few inches, so even though the cutbacks do not show any effect on the fatigue life of the pavement, it is not relevant to the efficacy of the treatment.

The cumulative dissipated energy is related to the amount of fatigue damage that a pavement can withstand. At low strain levels the cumulative dissipated energy is higher in the control beams than the treated beams. The statistical analysis showed a P-value of 0.0144 for the treatments meaning that the treatments had a significant effect on the cumulative dissipated energy. In this case, the treatments had a negative effect, although at higher strain levels the difference is negligible. Tukey's HSD showed that the EMS cutback was significantly different from the control, but the SESO cutback was not significantly different.

Disk-shaped Compact Tension Lab Results

Figure 15:
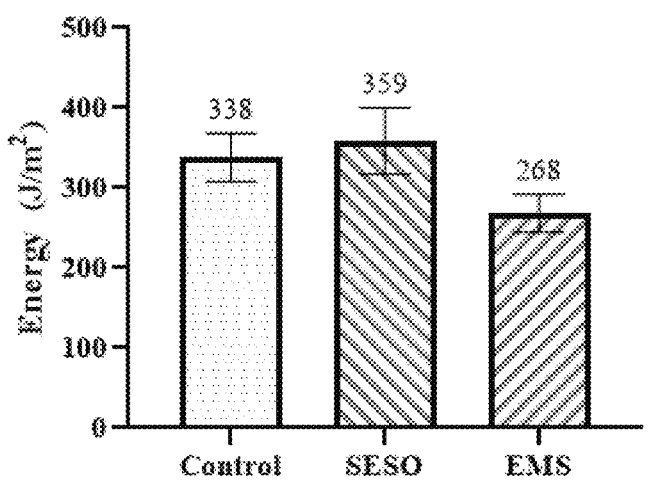
FIG. 15 shows the Disk-Shaped Compact Testing (DCT) results.

The DCT testing was performed at −12° C. This test temperature was chosen, because it is between 10° C. degrees above the low temperature PG for the control and the treated sections. The lab study cutback treated specimens were tested at each condition for a total of 9 tests. A simple statistical analysis was done with the fracture energy as the factor of interest and Tukey's HSD was used to test for differences in the treatments at a significance level of 0.05. The data from the DCT tests are presented in FIG. 15. The error bars shown on the data represent the standard error of the mean from the statistical analysis.

The statistical analysis shows that the treatments do not cause a significant effect on the fracture energy with a P-value of 0.2018, and Tukey's HSD shows that none of the treatments are significantly different from each other. This is likely due to the large variability within each test group. The EMS cutback resulted in a slightly reduced fracture energy. This was unexpected but may have been caused by the EMS over-softening the binder. If the binder is very soft at the tested temperature, the peak load is reduced and therefore the area under the curve is reduced, thus reducing the fracture energy.

Dynamic Modulus Lab Results

Figure 16:
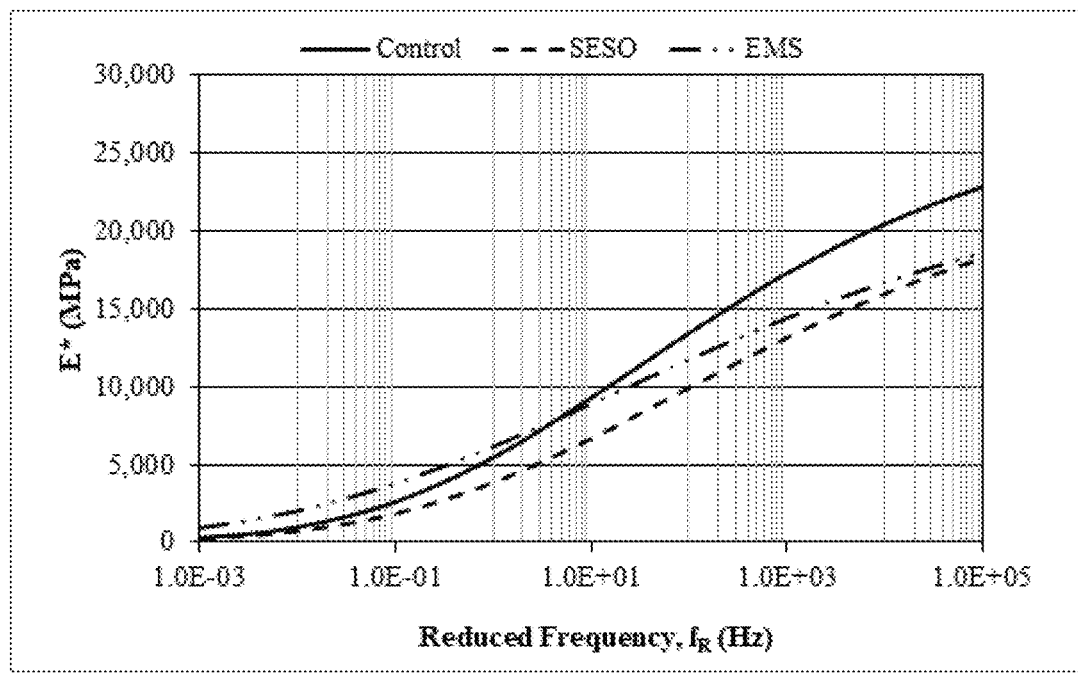
FIG. 16 shows the complex modulus Dynamic Shear Rheology (DSR) master curve results.
Figure 17:
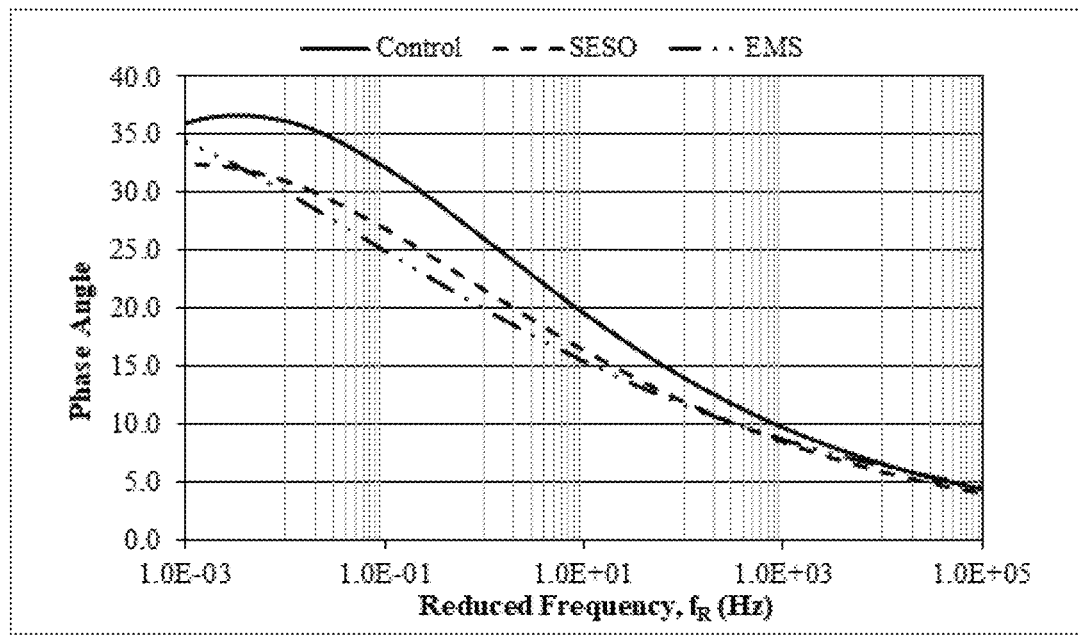
FIG. 17 shows the phase angle master curve results from dynamic modulus testing DSR results.

The dynamic modulus testing was performed on three 100 mm diameter, 150 mm tall cylindrical specimens from the LS-CB-Z series. Nine test specimens were prepared, and each was tested at 0° C., 15° C., and 30° C. for a total of 27 tests. The tests were performed over a range of frequencies from 25 Hz to 0.1 Hz. After the data was collected, the curves were shifted and a sigmoidal model was fit to the dynamic modulus and phase angle data, with the additional modification to the phase angle model using the method proposed by Podolsky et al. (*J. Assoc. of Asphalt Pav.* 71, (2002), which is hereby incorporated by reference in its entirety). Both the EMS and SESO cutbacks showed a softening effect or a reduction in the dynamic modulus at high frequency, or low temperatures. This is a favorable result, as the reduction in stiffness at low temperatures will greatly reduce the thermal cracking potential. At low frequency or high temperatures, the dynamic modulus was relatively similar to the control section, showing no significant softening at high temperature. This shows that the cutback treatments will not increase the rutting potential of the pavement. Additionally, the dynamic modulus test measures the strain in the middle 60 mm of the cylinder, so a treatment that is applied to the top would have to penetrate 45 mm before it would show any effect in this test. Surprisingly, the phase angles show a reduction at low frequency or high temperature. This indicates the pavement behaves more elastic at higher temperatures, which can be attributed to the reactivity of the RRM and its attendant influence on the asphaltene morphology. Results are shown in FIGS. 16 and 17.

Penetration Test Results

The results from the first method of penetration testing, where the slabs were treated and conditioned at two temperatures before extracting the asphalt binder, are shown in Table 5. The control slab was conditioned at 40° C., as there should be negligible difference in the PG when conditioned at 40° C. or 4° C. without UV exposure. The top 1/8" of the slabs was removed after conditioning to ensure that any of the cutback that had not penetrated in would not affect the results. In this section, the top slab is referring to the top 1/2" of material and bottom is referring to the second 1/2" of material, not the actual bottom of the original slab. At 4° C., there is a large difference in the PG from the top section to the bottom section. This is likely because the cutback is concentrated in the top 1/2" of the pavement due to the temperature hindering the penetration. In a field application, if the material was applied during cool weather it may concentrate in the top 1/2" of the pavement, but once the weather warms up, the cutback would continue to disperse and penetrate further down. At 40° C., the PG became minimally different between the top and bottom sections. Across all samples, the PG was reduced at the bottom, meaning that the material is penetrating at least one inch into the pavement.

TABLE 5

Penetration Test Results

| Section | Condition Temperature | PG | High Temperature | Low Temperature | ΔTc, ° C. |
|---|---|---|---|---|---|
| Control | 40° C. | 70-22 | 71.1 | −23.1 | 0.6 |
| SESO Top | 4° C. | 46-34 | 48.2 | −36.3 | −0.4 |
| SESO Bottom | 4° C. | 58-22 | 63.4 | −25.6 | 1.4 |
| SESO Top | 40° C. | 52-28 | 55.1 | −33.5 | 2.5 |
| SESO Bottom | 40° C. | 58-28 | 60.8 | −28.2 | 1.1 |
| EMS Top | 4° C. | 46-34 | 49.8 | −35.4 | 1.4 |
| EMS Bottom | 4° C. | 58-22 | 58.3 | −28.4 | 1.7 |
| EMS Top | 40° C. | 58-28 | 59.3 | −30.3 | 2.3 |
| EMS Bottom | 40° C. | 64-22 | 64.3 | −27.5 | 0.6 |

Figure 18:
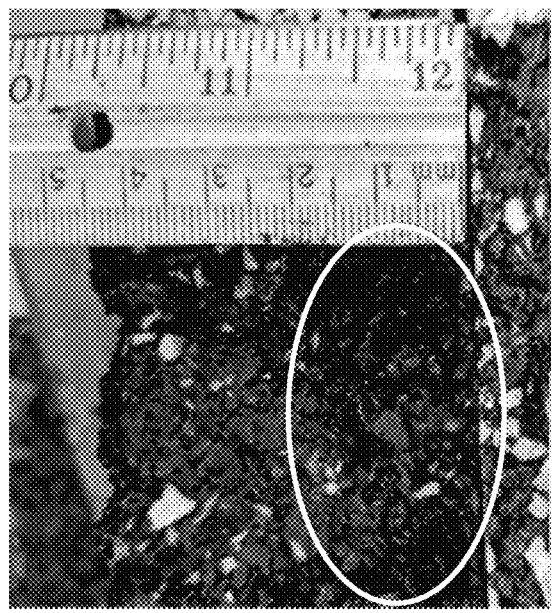
FIG. 18 shows the visual penetration depth of epoxidized methyl soyate (EMS).
Figure 19:
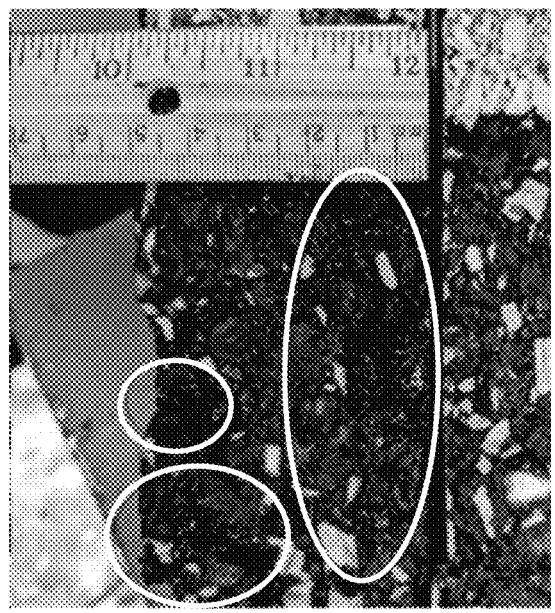
FIG. 19 shows the visual penetration depth of SESO.

The second method of penetration testing was the visual penetration measured on the −12° C. DCT specimens after fracturing. An example of both the EMS and SES cutbacks are shown in FIGS. 18 and 19. The cutback material shines in the light and can be clearly seen on the fractured surfaces. A control sample is shown just to the right in both images. For all DCT samples there was cutback material throughout the entire sample thickness meaning that the cutback is penetrating at least 50 mm. It seems that the majority of the cutback is concentrated in the top 20 to 25 mm of the samples but has a smaller concentration at greater depths. This method will be used in the analysis of the field study samples in the future.

Roofing Shingles

There are number of properties that must be met to characterize and qualify an asphalt shingle rejuvenator. The use of a shingle rejuvenator must provide benefit—increase the life cycle of the shingle and must retain critical performance properties of Fire Resistance, Hail Impact Resistance, Wind Resistance, Granule Retention, etc.

The roofing shingle rejuvenator was applied at a rate of 200 ft$^2$/gallon to architectural, gray in color, aged shingles. The shingles were then tested for: 1) Granular loss (ASTM D4977) in wet and dry conditions: Granules provide protection of the asphalt coating from the Sun and Rain and are key to fire and hail impact resistances. An improvement (less loss) of granules is deemed a significant benefit. 2) Pliability (ASTM D5147), 3) Fire Resistance (UL 790), 4) Hail Impact Resistance (FM 4473M, UL 2218), and 5) Color: we assumed the greater the change in color the less desirable. However, this may not be the case for every user. Since the aged shingles where a shade of gray, we presented the data of the L component of the CIELAB color scale. Hunter L, a, b and CIE 1976 L*a*b* (CIELAB) are both color scales based on the Opponent-Color Theory. This theory assumes that the receptors in the human eye perceive color as the following pairs of opposites. L scale: Light vs. dark where a low number (0-50) indicates dark and a high number (51-100) indicates light. A and b are the four unique colors of red, green, blue and yellow.

Color: the color of the asphalt shingle, after application, remained about the same. It is assumed the bigger the change in color the more the homeowners/users may object.

Granules Adhesion: samples exhibited a decreased granular loss in both the dry and wet conditions when compared to the control (untreated). Improved adhesion provides multiple benefits: improved fire and hail impact damage and reduced aging due to reduced asphalt exposure to UV and rain.

Tear Strength: Tear strength is correlated to coating embrittlement, the rejuvenators softened the coating. The softening resulted in reduces the Tear Strength.

Pliability: in the first pliability test all values meet the ASTM criteria, all Passed. In a second evaluation we used the standard mandrel bend test. The methodology used lowered the temperature of the specimen and mandrel 5° F. in increments until cracking was observed in 3 or more replicates run at each temperature. A 5-10° F. reduction in temperature is considered excellent. Samples treated with the rejuvenator tested at a temperature of 50-55° F. which is considered excellent.

Figure 20:
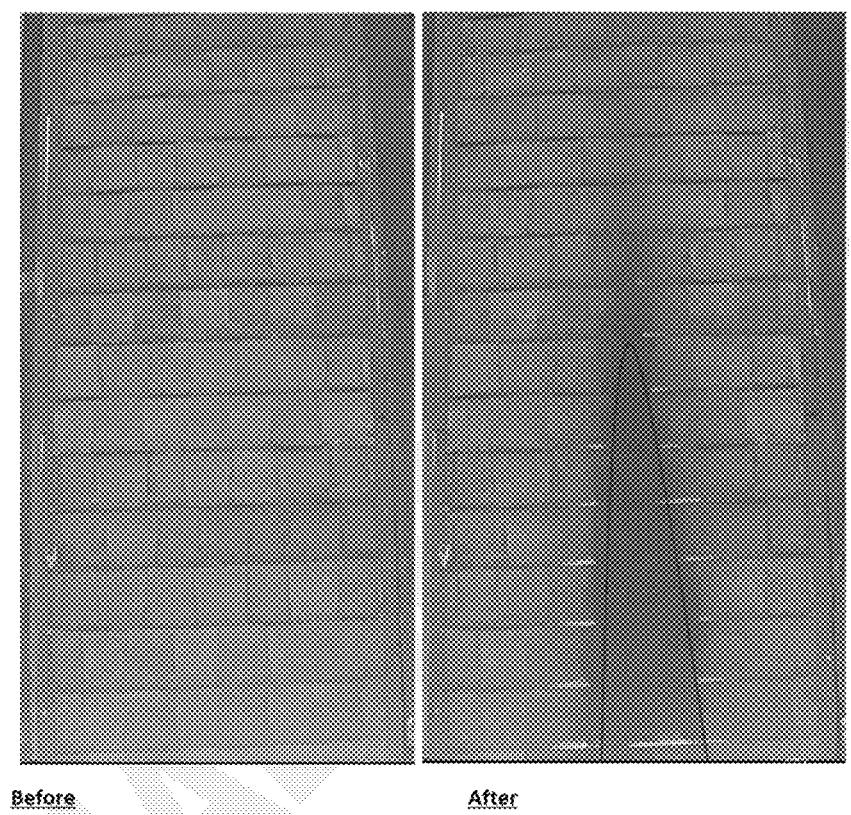
FIG. 20 shows the image of the control test asphalt shingles in the spread of flame test.
Figure 21:
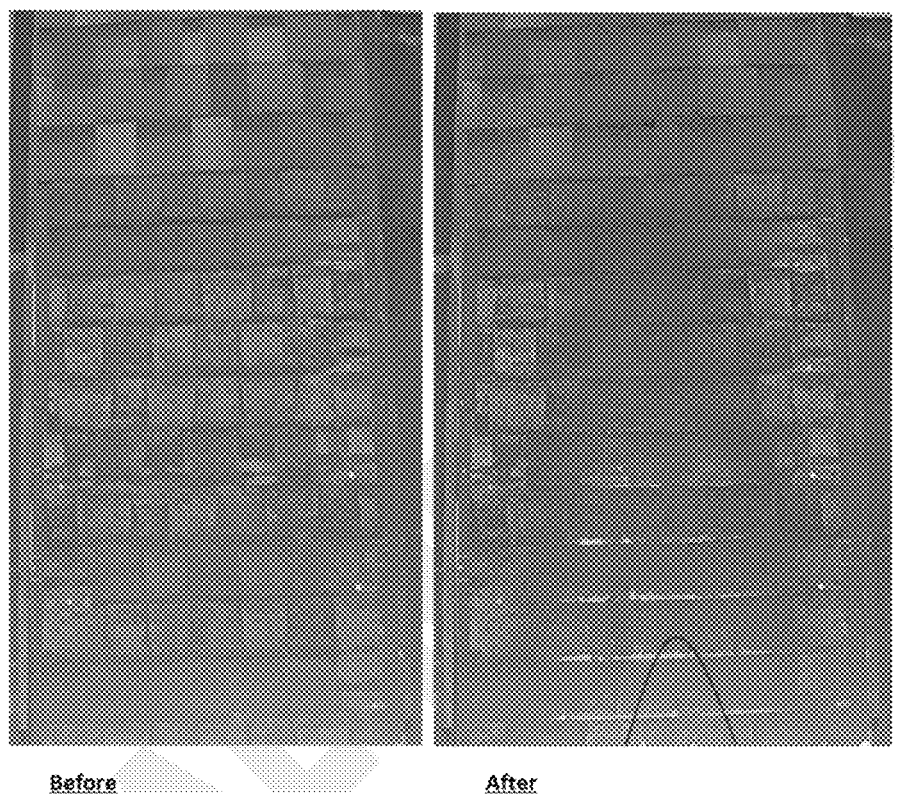
FIG. 21 shows the image of the treated asphalt shingles in the spread of flame test showing a reduction in the spread.

Fire Resistance: the application of the rejuvenator reduced the spread of fire by 70%, see FIGS. 20 and 21, a very significant reduction in the maximum spread in inches of the fire.

Hail Resistance: provided reduced damage to the shingles.

Bio-Cutbacks

Figure 22:
FIG. 22 shows the initial surface after treatment.

SESO and EMS bio-cutbacks were created by mixing 80% solvent with 20% 58-28S asphalt below 50° C. to prevent the reaction of the epoxy rings with the fresh asphalt binder. It is desired to have the epoxy rings react with the old pavement binder to help soften it. The bio-cutbacks were applied at 0.5 kg/m² (0.174 gal/sq. yd) using a paint brush and a scale in the lab. In the field the bio-cutback would be applied by a sprayer. The slabs were left in climate conditioned chambers for 5 days, one set at 4° C. and two sets at 40° C. The control slab was kept at 20° C. with no treatment for 7 days before undergoing the same extraction procedures as the treated slabs. To analyze the softening effect, the slabs are cut into the top ½" section and a second ½" section below that referred to as the bottom in this document. The excess material below 1" was discarded. The initial surface after treatment is show in FIG. 22.

Figure 23:
FIG. 23 shows EMS treated slab on day 5 at 4° C., with the control slab on the right.
Figure 24:
FIG. 24 shows EMS treated slab on day 5 at 40° C., with the control slab on the right.
Figure 25:
FIG. 25 shows SESO treated slab on day 5 at 4° C., with the control slab on the right.
Figure 26:
FIG. 26 shows SESO treated slab on day 5 at 40° C., with the control slab on the right.

After 5 days at 4° C., the EMS has not completely soaked into the slab. At 40° C. there was very little moisture left on the surface. The same is true for the SESO. The slabs were checked after 3 days, and the 40° C. slabs looked the same as day 5. It is possible that the material soaked in even sooner than 3 days. FIG. 23 shows EMS treated slab on day 5 at 4° C. FIG. 24 shows EMS treated slab on day 5 at 40° C. FIG. 25 shows SESO treated slab on day 5 at 4° C. FIG. 26 shows SESO treated slab on day 5 at 40° C. In each of FIGS. 23-26, the control slab with no treatment is shown on the right.

Figure 27:
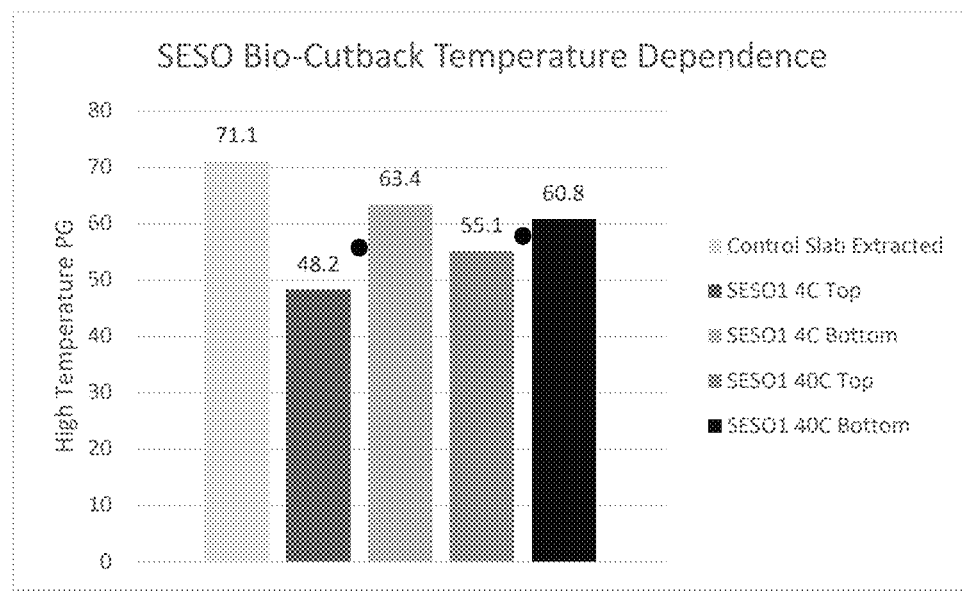
FIG. 27 shows the high PG SESO temperature dependence.
Figure 28:
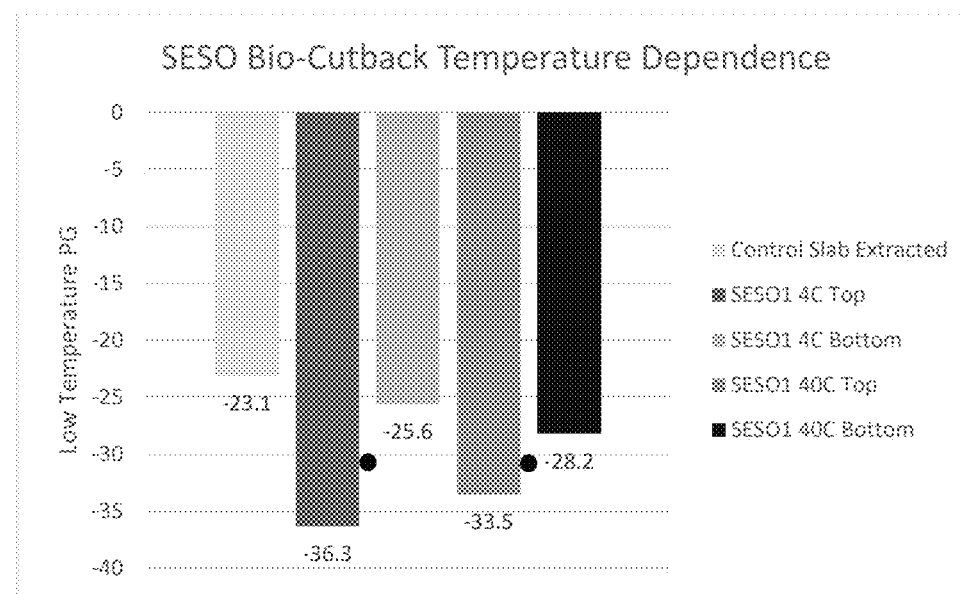
FIG. 28 shows the low PG SESO temperature dependence.

FIGS. 27 and 28 show the high and low PG SESO temperature dependence, respectively. The first bar in each of FIGS. 27 and 28 show the control slab PG. The second and third bars show the top and bottom respectively of the SESO treatment at 4° C. and the last two are the top and bottom of the SESO treatment at 40° C. It can be seen at 4° C. some of the material has penetrated into the lower ½" but most of the material is trapped in the top ½" causing very high softening. At 40° C., more material has penetrated and causes a more balanced softening to the top ½" and second ½" layer. The black dots in the bar charts show the average between the top and bottom.

Figure 29:
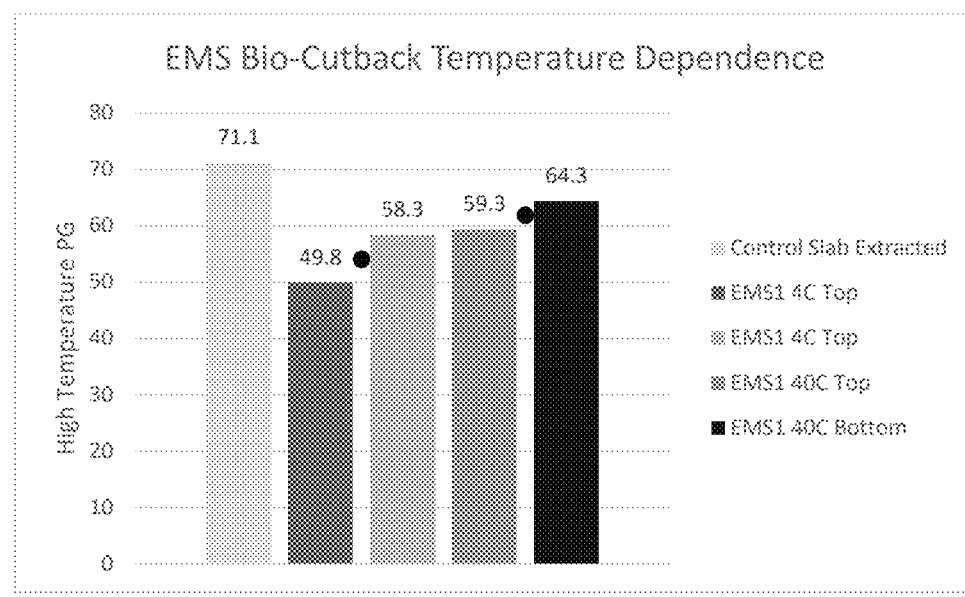
FIG. 29 shows the high PG EMS temperature dependence.
Figure 30:
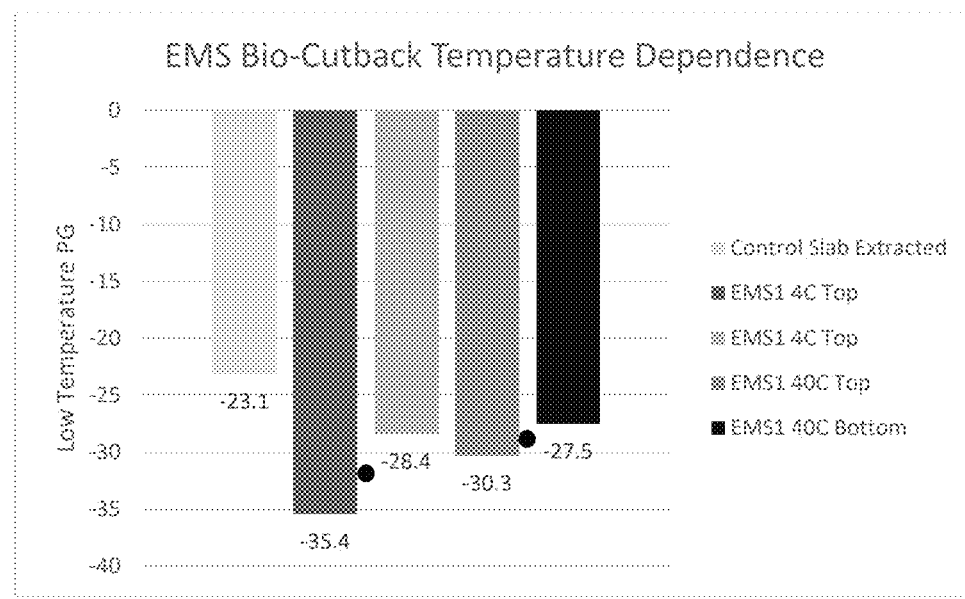
FIG. 30 shows the low PG EMS temperature dependence.

FIGS. 29 and 30 show the high and low PG EMS temperature dependence, respectively. The first bar in each of FIGS. 27 and 28 show the control slab PG. The second and third bars show the top and bottom, respectively, of the EMS treatment at 4° C., and the last two are the top and bottom of the EMS treatment at 40° C. Similar to the SESO, the EMS treatment at 4° C. had most of the material trapped in the top ½" of the mix, although a larger softening effect in the bottom was observed than the SESO. Likely due to the lower viscosity. At 40° C., the SESO had a superior performance at softening both the top and bottom. Both treatments were shown to penetrate at least ½" even when the pavement is treated at 4° C. It is likely if this bio-cutback were applied in the late fall or early spring, the solvent would stay towards the top until the temperature rises enough to promote dispersion lower into the mix. This causes some concern about rutting from excessive softening in the top layer.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. An emulsified coating product comprising:
water;
one or more surfactants; and
one or more rejuvenators of formula (X)

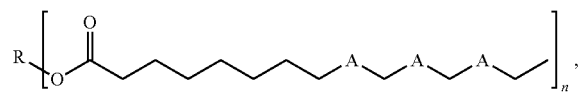

wherein:
each A is selected independently at each occurrence thereof from the group consisting of

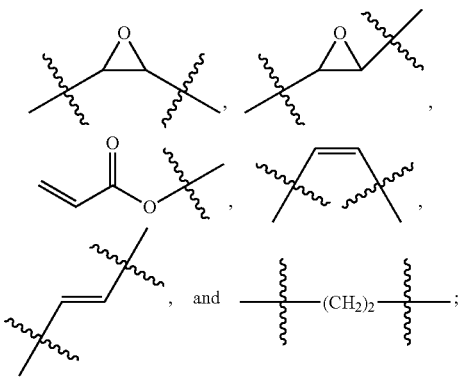

and
wherein at least one A is

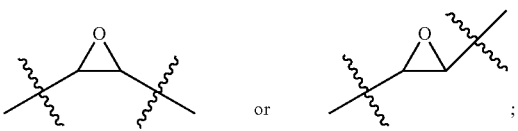 [SMILES: *C1OC1* ; *C1OC1*]

each

represents the point of attachment to a —CH$_2$— group;

n is 1, 2, or 3;

R is selected from the group consisting of H, C$_1$-C$_{23}$ alkyl, and benzyl, wherein the C$_1$-C$_{23}$ alkyl can be optionally substituted with an aryl, heteroaryl, or heterocyclyl; or R is selected from the group consisting of

[chemical structures showing various substituted glyceride-type moieties with OR$^2$, OR$^3$, R$^1$O groups]

, and

;

each

[structure indicating point of attachment]

represents the point of attachment to a

[structure: —O—C(O)—(CH$_2$)$_n$—A—A—A— repeating unit]

moiety;

R$^1$, R$^2$, and R$^3$ are independently selected from the group consisting of —H and —C(O)R$^4$;

R$^4$ is H, C$_1$-C$_{23}$ alkyl, or aryl;

wherein the one or more rejuvenators of formula (X) have an N$_e$ value which is greater than about 1.0 and an N$_d$ value less than about N$_{d,0}$−1; and wherein the components form an emulsion.

2. The emulsified coating product of claim 1, wherein the one or more surfactants is selected from the group consisting of cationic emulsifying agents, anionic emulsifying agents, nonionic emulsifying agents, lecithin, and a combination thereof.

3. The emulsified coating product of claim 1, wherein the one or more rejuvenators of formula (X) is sub-epoxidized soybean oil (SESO).

4. The emulsified coating product of claim 1 further comprising:
one or more binders.

5. The emulsified coating product of claim 4, wherein the one or more binders is selected from the group consisting of bitumen, bio-asphalt, reclaimed asphalt shingles (RAS), plant oil binders, animal fat binders, maltenes, and a combination thereof.

6. The emulsified coating product of claim 1 further comprising:
one or more polymers.

7. The emulsified coating product of claim 6, wherein the one or more polymers is selected from the group consisting of polyethylene, cross-linked polyethylene polypropylene, polybutadiene, polyisoprene, polyethylene terephthalate, polyvinyl alcohol, butyl acrylate, ethyl acrylate, methyl acrylate, poly(acrylated epoxidized triglycerides), and a combination thereof.

8. The emulsified coating product of claim 1 further comprising:
one or more colorants.

9. The emulsified coating product of claim 1 further comprising:
one or more antimicrobials.

10. The emulsified coating product of claim 1 further comprising:
one or more stabilizing or gelling agents.

11. The emulsified coating product of claim 1 further comprising:
one or more crosslinkers.

12. The emulsified coating product of claim 1 further comprising:
one or more antistripping agents.

13. The emulsified coating product of claim 1 further comprising:
one or more wetting agents.

14. A method of treating an asphalt roofing system comprising:
contacting the asphalt roofing system with the emulsified coating product of claim 1.

15. The emulsified coating product of claim 6, wherein the one or more polymers is one or more copolymers.

* * * * *